(12) United States Patent
Huang et al.

(10) Patent No.: US 11,937,300 B2
(45) Date of Patent: Mar. 19, 2024

(54) MULTIPLE ACCESS POINTS COORDINATION

(71) Applicant: Intel Corporation, Santa Clara, CA (US)

(72) Inventors: Po-Kai Huang, San Jose, CA (US); Qinghua Li, San Ramon, CA (US); Xiaogang Chen, Portland, OR (US); Robert J. Stacey, Portland, OR (US); Laurent Cariou, Milizac (FR); Feng Jiang, Sunnyvale, CA (US); Yaron Alpert, Hod Hasharoni (IL)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 17/084,755

(22) Filed: Oct. 30, 2020

(65) Prior Publication Data

US 2021/0051722 A1 Feb. 18, 2021

Related U.S. Application Data

(60) Provisional application No. 62/930,243, filed on Nov. 4, 2019, provisional application No. 62/927,840, filed on Oct. 30, 2019.

(51) Int. Cl.
*H04W 4/00* (2018.01)
*H04L 1/00* (2006.01)
(Continued)

(52) U.S. Cl.
CPC ....... *H04W 74/0816* (2013.01); *H04L 1/0003* (2013.01); *H04L 1/0009* (2013.01);
(Continued)

(58) Field of Classification Search
CPC ............... H04W 72/0446; H04W 74/0816
See application file for complete search history.

(56) References Cited

U.S. PATENT DOCUMENTS

| 11,696,354 | B2 * | 7/2023 | Ryu | H04W 72/0446 |
| | | | | 370/329 |
| 2017/0170932 | A1 * | 6/2017 | Chu | H04B 7/0452 |

(Continued)

FOREIGN PATENT DOCUMENTS

| EP | 3849099 A1 * | 7/2021 | ........... H04B 7/0626 |
| WO | WO-2022045963 A1 * | 3/2022 | ........... H04B 7/0417 |
| WO | WO-2022226298 A1 * | 10/2022 | ............. H04B 7/024 |

*Primary Examiner* — Chi H Pham
*Assistant Examiner* — Elisabeth Benoit Magloire
(74) *Attorney, Agent, or Firm* — Schwegman Lundberg & Woessner, P.A.

(57) ABSTRACT

Methods, apparatuses, and computer readable media for a common preamble for wireless local-area networks (WLANs). An apparatus of an access point (AP) or station (STA) comprising processing circuitry configured to encode an AP trigger frame that includes a resource allocation for other APs to transmit trigger frames to perform an uplink or downlink multi-user transmission with stations (STAs). The resource allocation includes information so that the transmissions are coordinated at the physical level to lessen interference among the APs and the stations. The processing is configured to encode a trigger frame for multi-AP request-to-send (RTS), the multi-AP trigger frame comprising for each of a plurality of APs, the trigger frame indicating that each of a plurality of APs are to transmit a physical (PHY) protocol data unit (PPDU) comprising a request-to-send (RTS) or multi-user (MU) RTS (MU-RTS).

19 Claims, 31 Drawing Sheets

(51) Int. Cl.
*H04L 5/00* (2006.01)
*H04L 27/26* (2006.01)
*H04W 72/0446* (2023.01)

(52) U.S. Cl.
CPC ........ *H04L 5/0007* (2013.01); *H04L 27/2692* (2013.01); *H04W 72/0446* (2013.01)

(56) References Cited

U.S. PATENT DOCUMENTS

| | | | | |
|---|---|---|---|---|
| 2020/0045656 | A1* | 2/2020 | Verma | H04W 56/001 |
| 2020/0076519 | A1* | 3/2020 | Asterjadhi | H04L 1/0027 |
| 2020/0245352 | A1* | 7/2020 | Seok | H04W 72/29 |
| 2021/0250133 | A1* | 8/2021 | Chun | H04L 1/00 |
| 2021/0307099 | A1* | 9/2021 | Ryu | H04W 56/001 |

* cited by examiner

MULTIPLE ACCESS POINTS COORDINATION

PRIORITY CLAIM

This application claims the benefit of priority under 35 USC 119(e) to U.S. Provisional Patent Application Ser. No. 62/927,840, filed Oct. 30, 2019, and U.S. Provisional Patent Application Ser. No. 62/930,243, filed Nov. 4, 2019, both of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards with multiple-APs. Some embodiments relate to transmitting RTSs/CTSs with multi-APs. Some embodiments relate to coordinating physical level transmissions to reduce interference.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
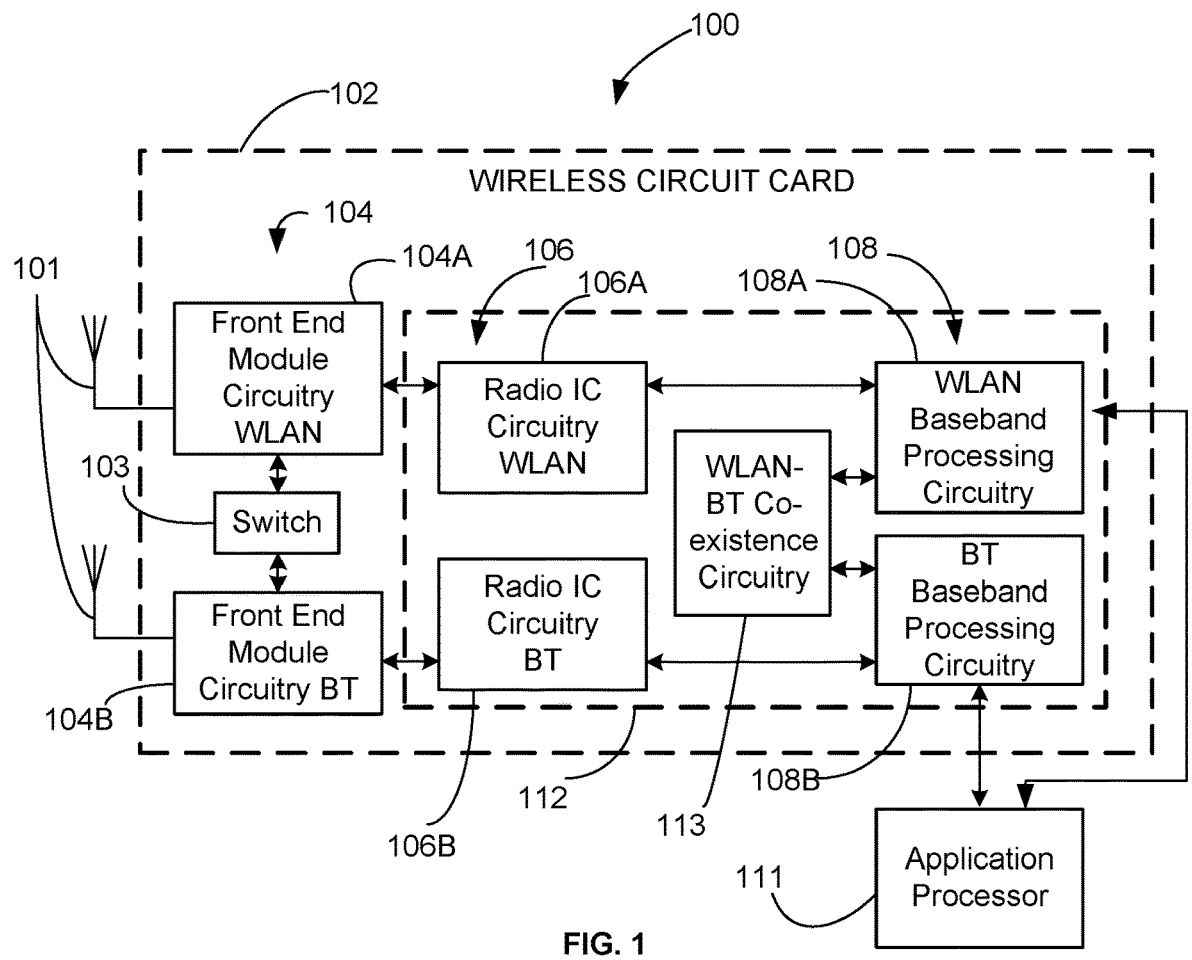
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
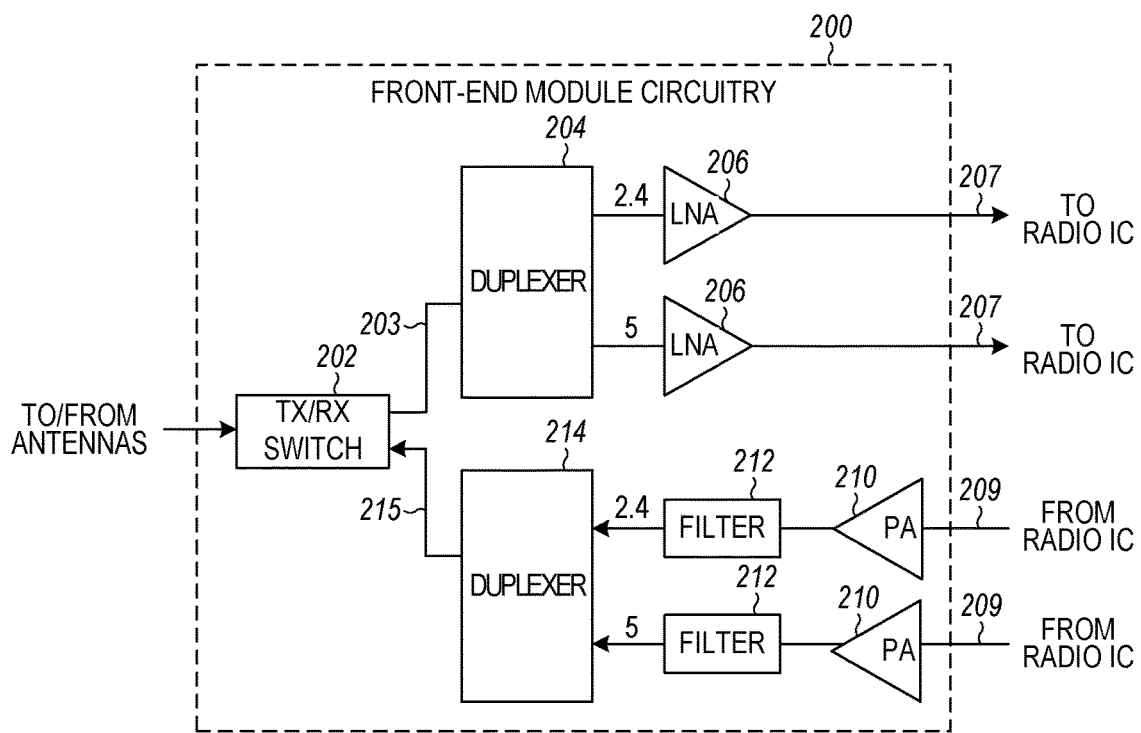
FIG. 2 illustrates FEM circuitry in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
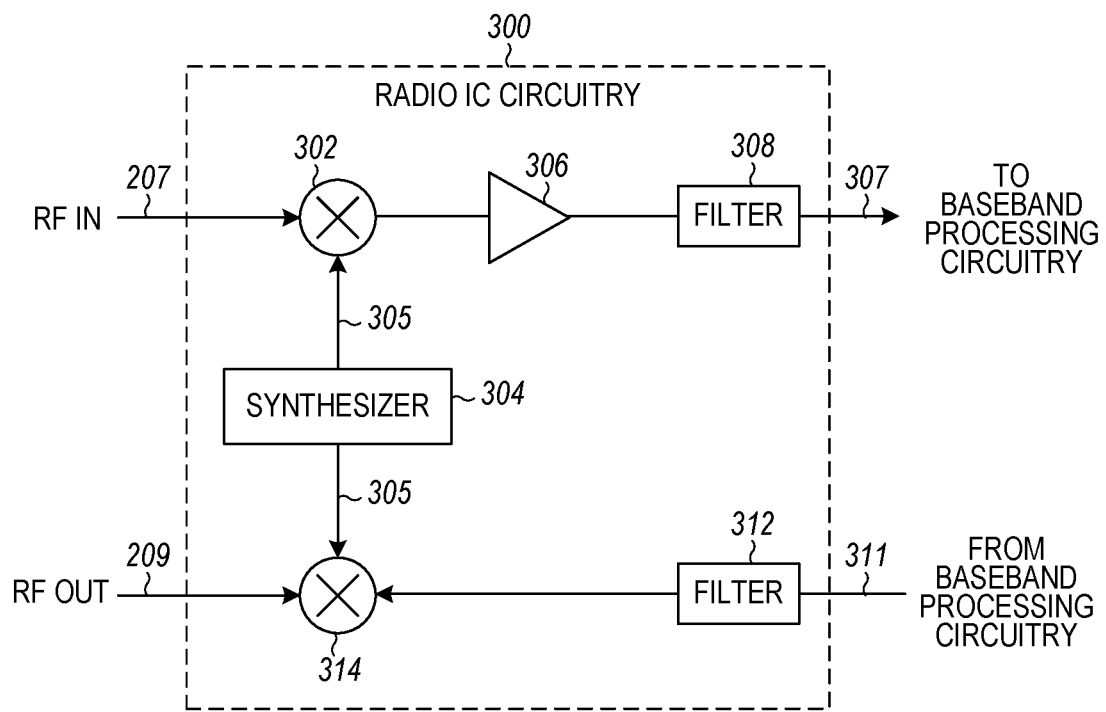
FIG. 3 illustrates radio integrated circuit (IC) circuitry in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
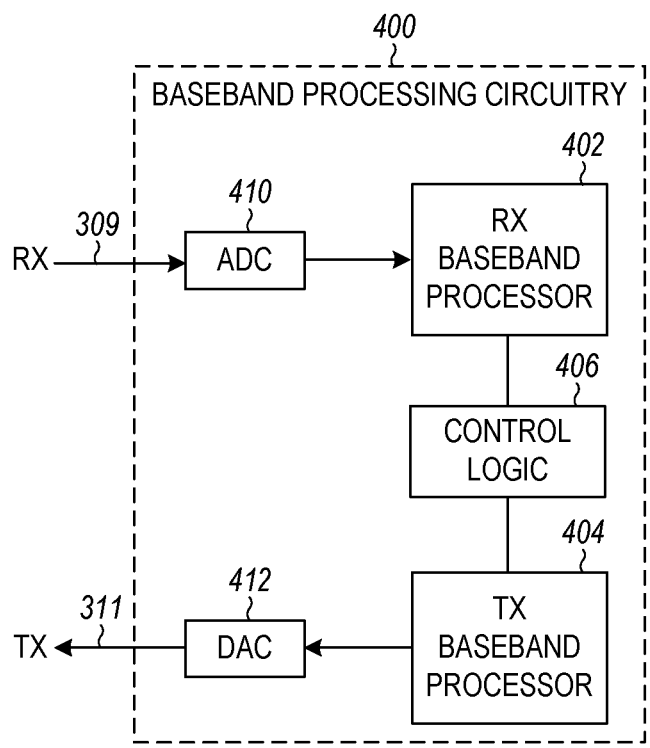
FIG. 4 illustrates a functional block diagram of baseband processing circuitry in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
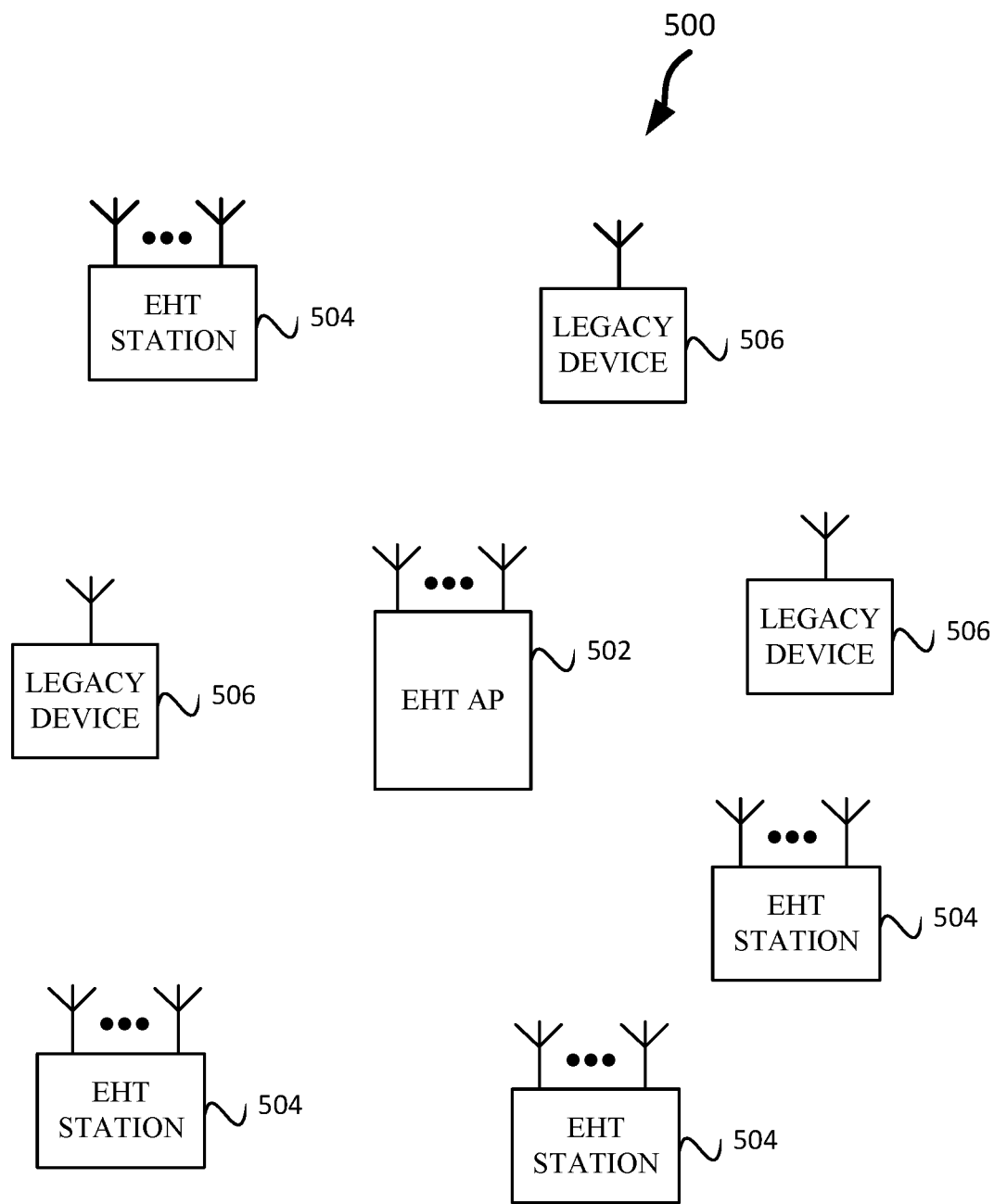
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of EHT (e.g., IEEE 802.11ax/be) stations (STAs) 504, and a plurality of legacy (e.g., IEEE 802.11g/n/ac) devices 506. In some embodiments, the EHT STAs 504 and/or EHT AP 502 are configured to operate in accordance with IEEE 802.11 extremely high throughput (EHT). In some embodiments, the EHT STAs 504 and/or HE AP 520 are configured to operate in accordance with IEEE 802.11az. In some embodiments, IEEE 802.11EHT may be termed Next Generation 802.11. In some embodiments, the EHT AP 502 may be configured to operate a HE BSS, ER BSS, and/or a BSS. Legacy devices may not be able to operate in the HE BSS and beacon frames in the HE BSS may be transmitted using HE PPDU's. An ER BSS may use ER PPDUs to transmit the beacon frames and legacy devices 506 may not be able to decode the beacon frames and thus are not able to operate in an ER BSS. The BSSs, e.g., BSS, ER BSS, and HE BSS, may used different BSSIDs.

The EHT AP 502 may be an AP using the IEEE 802.11 to transmit and receive. The EHT AP 502 may be a base station. The EHT AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. EHT AP 502 may be connected to the internet. The EHT AP 502 and/or EHT STA 504 may be configured for one or more of the following: 320 MHz bandwidth, 16 spatial streams, multi-band or multi-stream operation (e.g., as disclosed in conjunction with FIG. 8), and 4096 QAM.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the EHT AP 502 and EHT STAs 504 are configured to operate in accordance with IEEE 802.11EHT, the legacy devices 506 may include devices that are configured to operate in accordance with IEEE 802.11ax. The EHT STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the EHT STAs 504 may be termed extremely high throughput (EHT) stations or stations.

The EHT AP 502 may communicate with legacy devices 506 in accordance with legacy IEEE 802.11 communication techniques. In example embodiments, the EHT AP 502 may also be configured to communicate with EHT STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160

MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the EHT AP 502, EHT STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a EHT AP 502 may operate as a master station which may be arranged to contend for a wireless medium (e.g., during a contention period) to receive exclusive control of the medium for a transmission opportunity (TXOP). The EHT AP 502 may transmit an EHT/HE trigger frame transmission, which may include a schedule for simultaneous UL transmissions from EHT STAs 504. The EHT AP 502 may transmit a time duration of the TXOP and sub-channel information. During the TXOP, EHT STAs 504 may communicate with the EHT AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the EHT AP 502 may communicate with EHT stations 504 using one or more HE or EHT frames. During the TXOP, the EHT STAs 504 may operate on a sub-channel smaller than the operating range of the EHT AP 502. During the TXOP, legacy stations refrain from communicating. The legacy stations may need to receive the communication from the EHT AP 502 to defer from communicating.

In accordance with some embodiments, during the TXOP the EHT STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The EHT AP 502 may also communicate with legacy stations 506 and/or EHT stations 504 in accordance with legacy IEEE 802.11 communication techniques. In some embodiments, the EHT AP 502 may also be configurable to communicate with EHT stations 504 outside the HE TXOP in accordance with legacy IEEE 802.11 or IEEE 802.11EHT/ax communication techniques, although this is not a requirement.

In some embodiments the EHT station 504 may be a "group owner" (GO) for peer-to-peer modes of operation. A wireless device may be a HE station 502 or a EHT AP 502. In some embodiments, the EHT STA 504 and/or EHT AP 502 may be configured to operate in accordance with IEEE 802.11mc. In example embodiments, the radio architecture of FIG. 1 is configured to implement the EHT STA 504 and/or the EHT AP 502. In example embodiments, the front-end module circuitry of FIG. 2 is configured to implement the EHT STA 504 and/or the EHT AP 502. In example embodiments, the radio IC circuitry of FIG. 3 is configured to implement the EHT station 504 and/or the EHT AP 502. In example embodiments, the base-band processing circuitry of FIG. 4 is configured to implement the EHT station 504 and/or the EHT AP 502.

In example embodiments, the EHT stations 504, EHT AP 502, an apparatus of the EHT stations 504, and/or an apparatus of the EHT AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-31.

In example embodiments, the EHT station 504 and/or the EHT AP 502 are configured to perform the methods and operations/functions described herein in conjunction with FIGS. 1-31. In example embodiments, an apparatus of the EHT station 504 and/or an apparatus of the EHT AP 502 are configured to perform the methods and functions described herein in conjunction with FIGS. 1-31. The term Wi-Fi may refer to one or more of the IEEE 802.11 communication standards. AP and STA may refer to EHT/HE AP 502 and/or EHT/HE station 504 as well as legacy devices 506.

In some embodiments, a HE AP STA may refer to a EHT AP 502 and/or a EHT STAs 504 that is operating as a HE APs 502. In some embodiments, when a EHT STA 504 is not operating as a HE AP, it may be referred to as a HE non-AP STA or HE non-AP. In some embodiments, EHT STA 504 may be referred to as either a HE AP STA or a HE non-AP. EHT may refer to a next generation IEEE 802.11 communication protocol, which may be IEEE 802.11be or may be designated another name.

Figure 6:
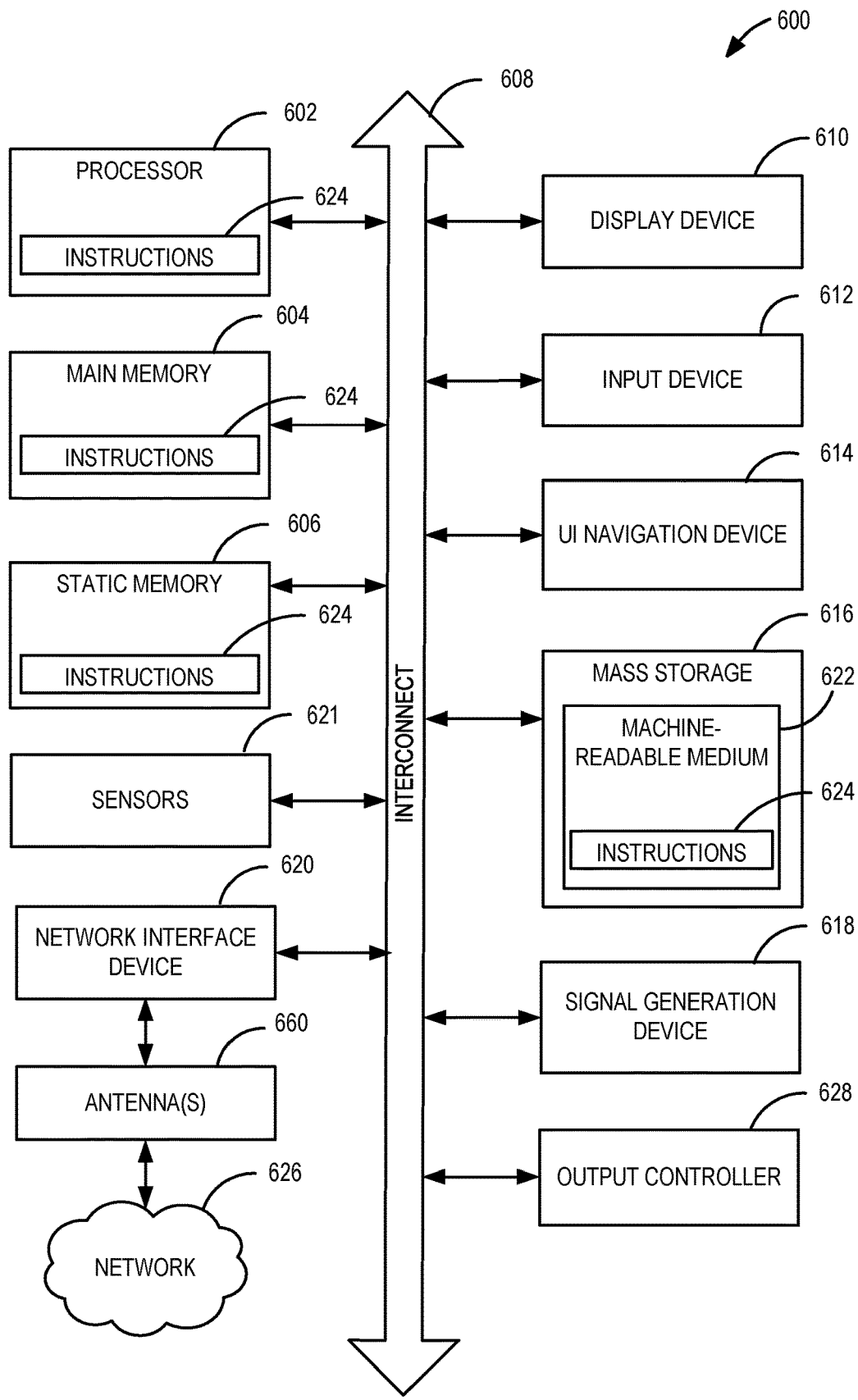
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a EHT AP 502, EHT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
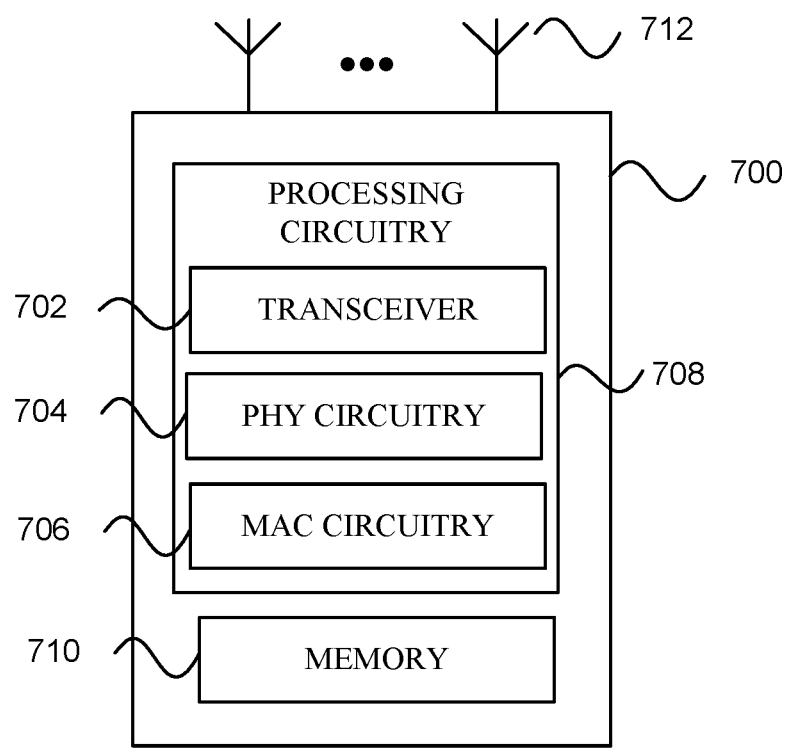
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a EHT STA 504, EHT AP 502, and/or a HE STA or HE AP. A EHT STA 504, EHT AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., EHT AP 502, EHT STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., EHT AP 502 and/or EHT STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the EHT stations 504 of FIG. 5 or wireless device 700) and an access point (e.g., the EHT AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

A technical problem in IEEE 802.11 is how to integrate a new generation with the old generations. A new amendment often requires new SIG fields that include information to support new physical (PHY)/media access control (MAC) features for the new amendment. The new SIGs are placed after the L-SIG field so that legacy device 506 will decode the L-SIG and determine a length of the PPDU or packet and defer from transmitting for a time based on the length. When new SIG fields have been defined in a new amendment, for example the IEEE 802.11ax HE-SIG-A, only devices that support IEEE 802.11ax and any follow-on amendments (e.g. IEEE 802.11be) can decode the information in the HE-SIG-A field. Pre-IEEE 802.11ax devices (e.g. legacy device 506) are not able to decode later generation SIG field as they do not know the format to decode the later generation SIG field, e.g., HE-SIG-A or EHT-SIG. However, some of the information (e.g., BSS color, TxOP duration, bandwidth) in later generation SIGs (e.g., HE-SIGA or EHT-SIG) needs to be signaled in future amendments for coexistence, e.g., intra-physical layer (PHY) protocol data unit (PPDU) PPDU power save.

Some embodiments improve coexistence among different IEEE 802.11 STAs (e.g., EHT STAs 504 and HE STAs) and therefore improve overall network efficiency and enable power saving. For example, in some embodiments, intra-PPDU power saving and spatial reuse are improved by providing a common preamble with a common SIG field that also may reduce detection and classification of PPDUs.

Figure 8:
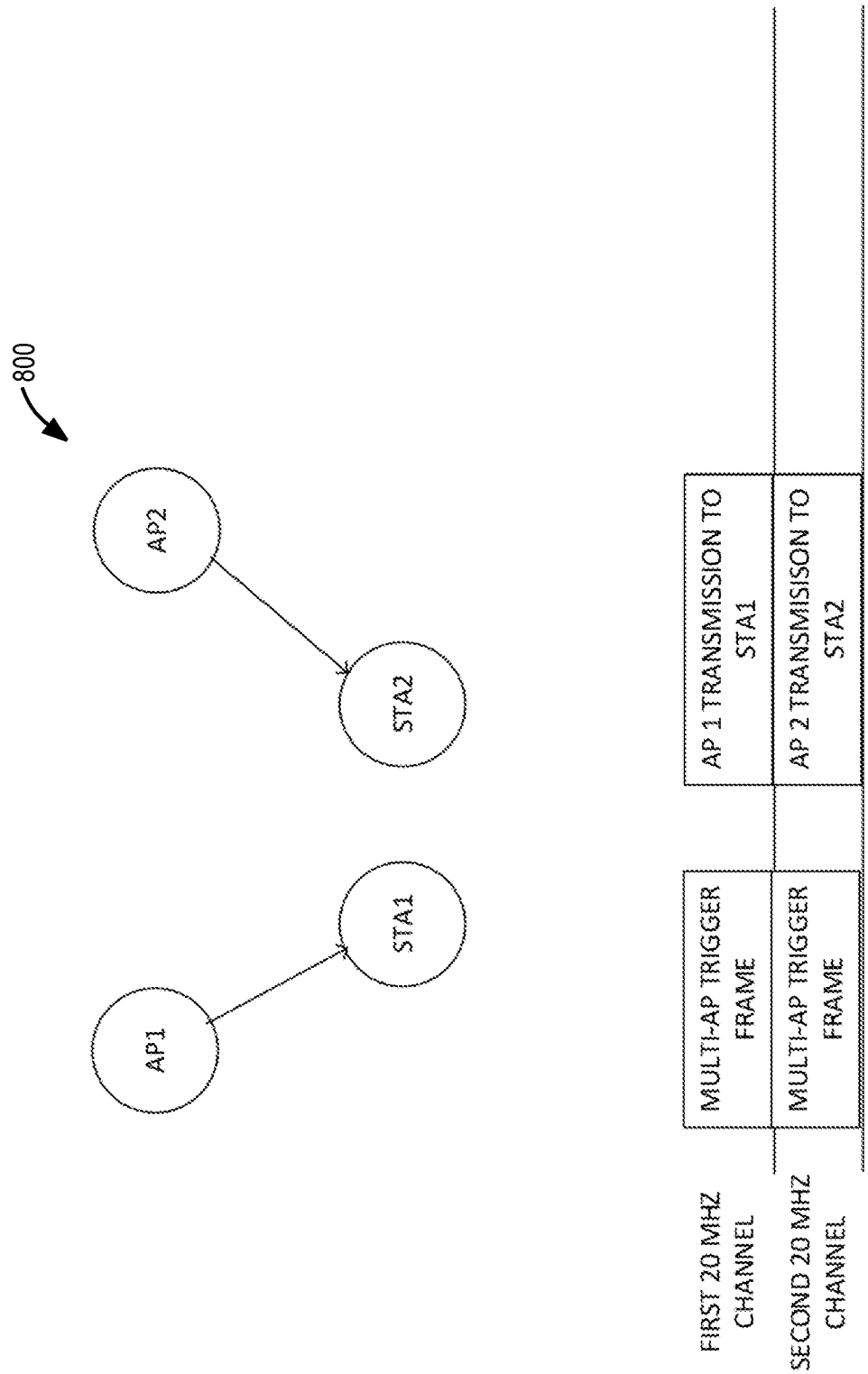
FIG. 8 illustrates multiple APs simultaneous transmissions, in accordance with some embodiments.

FIG. 8 illustrates multiple APs simultaneous transmissions 800, in accordance with some embodiments. STA1 and STA2 are EHT stations 504, in accordance with some embodiments. AP1 and AP2 are EHT APs 502, in accordance with some embodiments. FIG. 8 illustrates a mechanism for multiple APs to participate in a simultaneous transmission through frequency domain sharing. AP1 and AP2 are triggered to transmit to different STAs in different frequency. Although, only one STA is illustrated per AP, more than one STA per AP may participate. Additionally, more than two APs may participate in the simultaneous transmission. In FIG. 8, AP1 is allocated a first 20 MHz channel and AP2 is allocated a second 20 MHz change. In some embodiments the APs may be allocated different spatial streams for simultaneous transmission to different STAs or the one or more same STAs.

Figure 9:
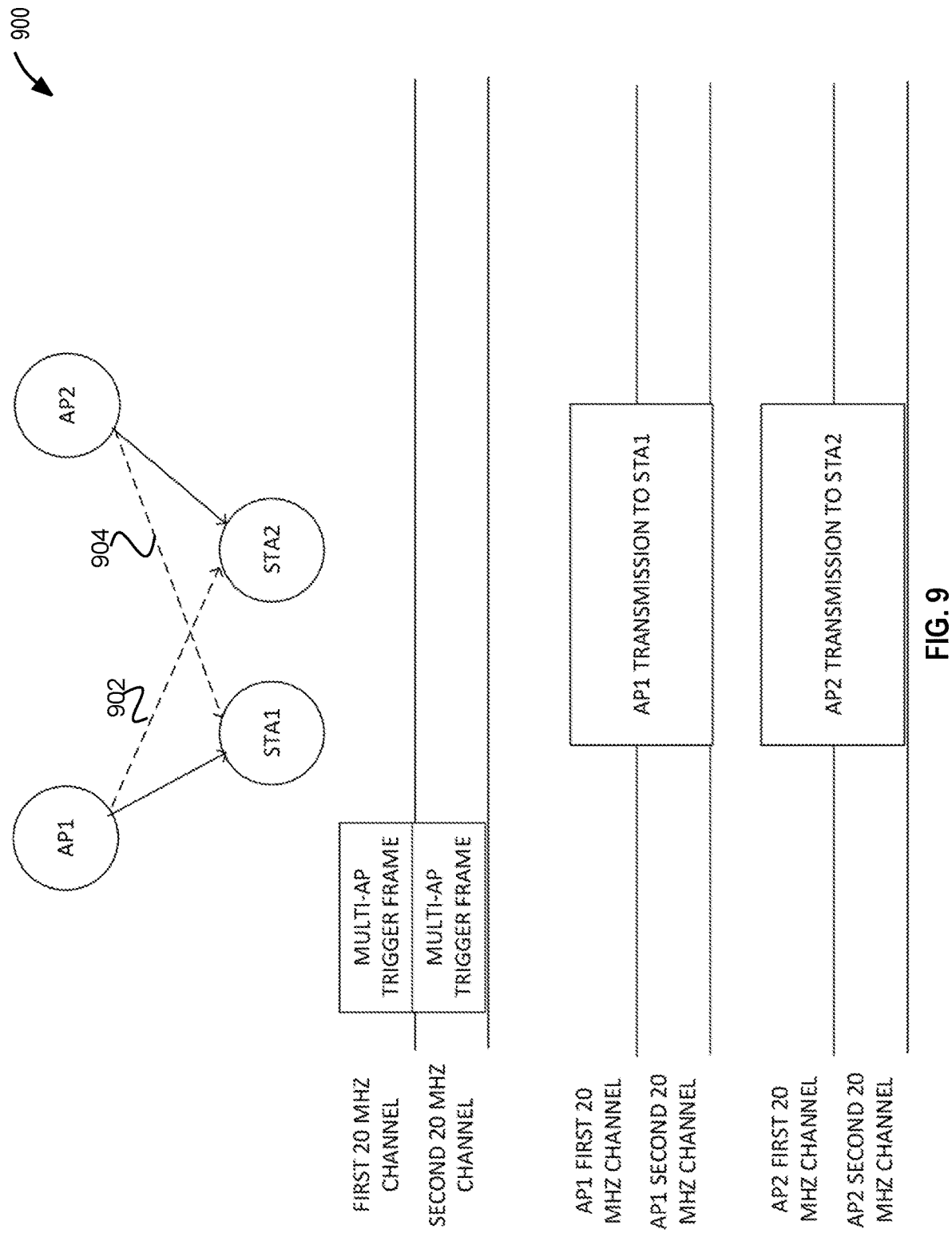
FIG. 9 illustrates coordinated beamforming by multiple APs, in accordance with some embodiments.

FIG. 9 illustrates coordinated beamforming by multiple APs 900, in accordance with some embodiments. AP1 and AP2 are triggered to transmit to different STAs in the same frequency. However, AP and AP2 use additional antennas to transmit signals 902, 904 to null the interference to other STAs, shown as dashed line below.

Figure 10:
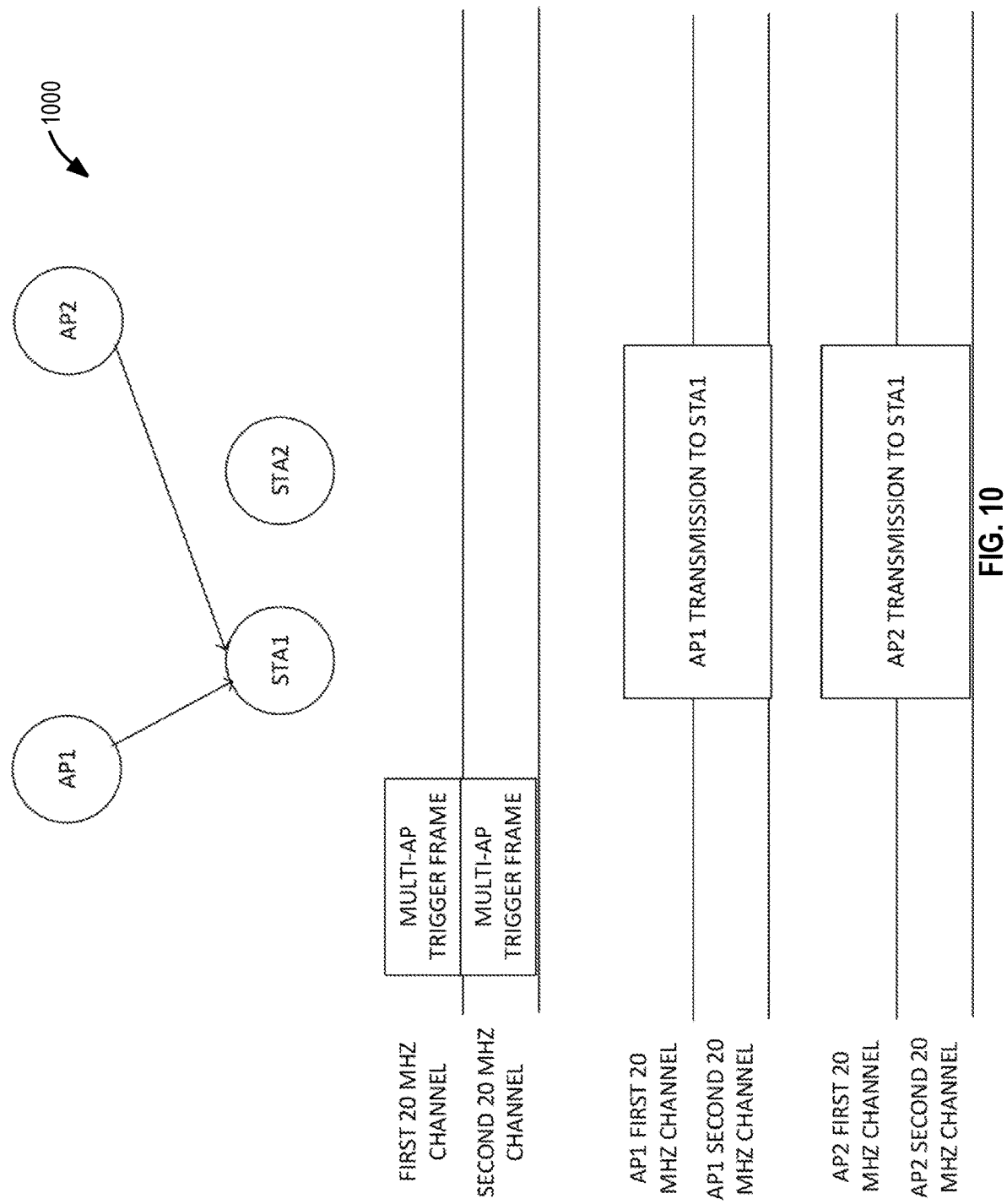
FIG. 10 illustrates multiple APs coordinated with joint transmission 1000, in accordance with some embodiments.

FIG. 10 illustrates multiple APs coordinated with joint transmission 1000, in accordance with some embodiments. FIG. 10 illustrates joint transmissions where two non-collocated APs, e.g., AP1 and AP2, jointly transmit a transmission such as a data frame or other type of frame to STA1. AP and AP2 are allocated resources to transmit transmissions to STA1 based on frequency division, in accordance with some embodiments. In some embodiments, spatial streams may be allocated to AP1 and AP2 to transmit transmissions to a STA.

Figure 11:
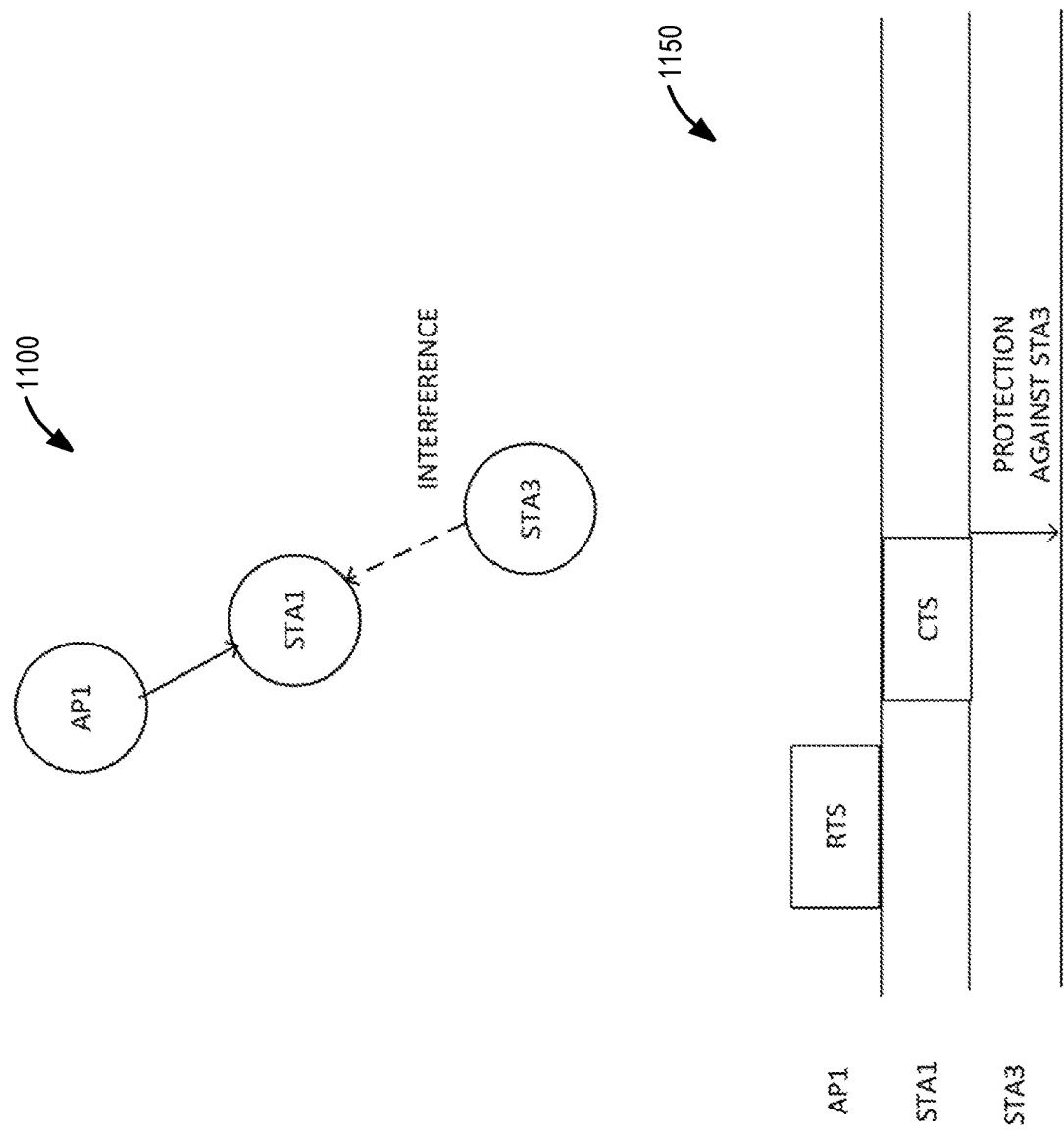
FIG. 11 illustrates a hidden node, in accordance with some embodiments.

FIG. 11 illustrates a hidden node 1100, in accordance with some embodiments. To stop a hidden node, e.g., STA3, from transmitting when AP1 transmits to STA1, a request to send (RTS) and clear-to-send (CTS) exchange is performed prior to the transmission. A multi-user (MU)-RTS/CTS exchange for multi-user transmission may be performed to achieve protection where the STAs receiving the MU RTS/CTS from the AP transmit a CTS so that hidden nodes, e.g., STA3, will set their virtual network allocation vector (NAV).

For example, in FIG. 11, STA3 is hidden to AP1 and when AP1 transmits to STA1, STA3 may transmit and interfere with the transmission from AP1 to STA1. STA3 sets the virtual NAV which gives protection against STA3 transmitting during the transmission from AP1 to STA1.

Figure 12:
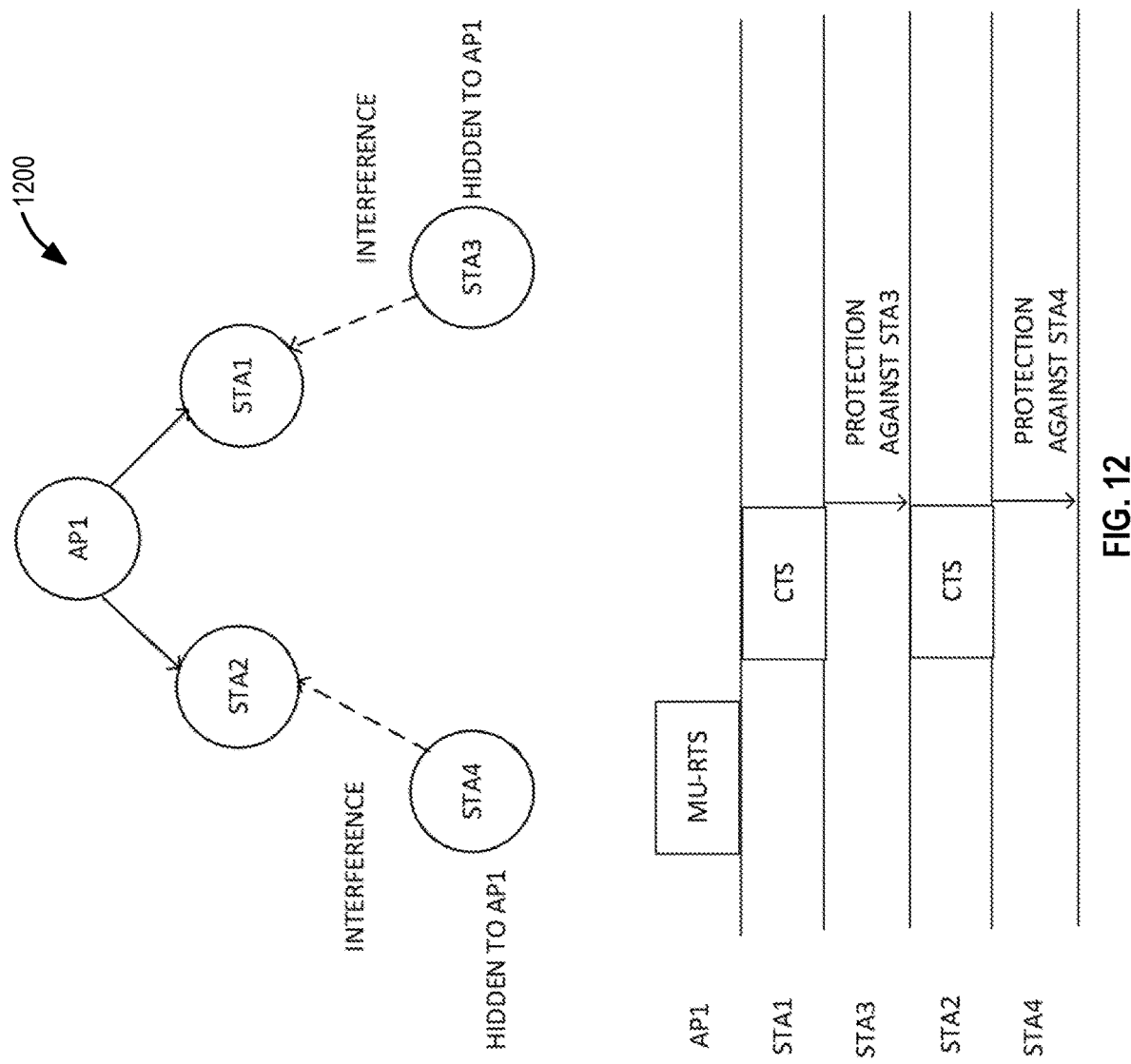
FIG. 12 illustrates a multi-user (MU) request-to-send (RTS)/clear-to-send (CTS), in accordance with some embodiments.

FIG. 12 illustrates a multi-user (MU) request-to-send (RTS)/clear-to-send (CTS) 1200, in accordance with some embodiments. FIG. 12 illustrates a MU RTS-CTS so that STA3 and STA4 will set their virtual NAVs and not transmit during a transmission from AP1 to STA2 and STA1. AP1 may send a RTS trigger frame or other type of frame indicating that STA1 and STA2 should transmit CTSs so that the hidden nodes from AP1 will receive the CTSs and defer or set their virtual NAVs and not transmit for a duration that is indicated in the RTS trigger frame. With multi-AP operation there may be more hidden nodes that may not be reachable by a transmission from a single AP to STAs that then transmit CTSs.

Figure 13:
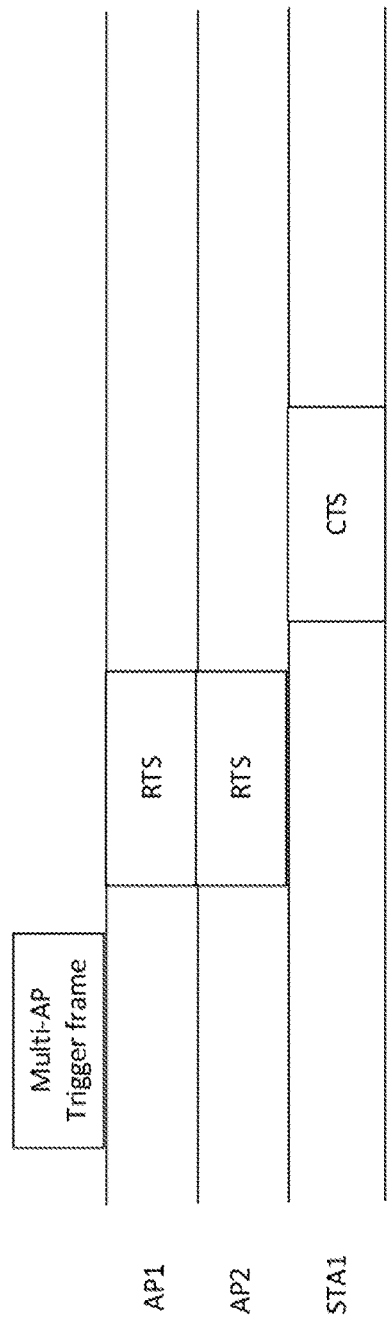
FIG. 13 illustrates a multi-AP trigger frame, in accordance with some embodiments.

FIG. 13 illustrates a multi-AP trigger frame 1300, in accordance with some embodiments. The multi-AP trigger frame may be transmitted by AP1, AP2, or another AP. AP1 and AP2 receive the multi-AP trigger frame and transmit RTSs or MU-RTSs, and the STAs indicated in the RTSs or MU-RTSs respond with CTSs. STA1 is the only STA that is illustrated but there may be many STAs including many hidden STAs. The STAs may be associated with AP1, AP2, another AP, or a extended BSS that includes AP1, AP2, and may include other APs. The sequence illustrated in FIG. 13 may be termed a single user sequence.

Figure 14:
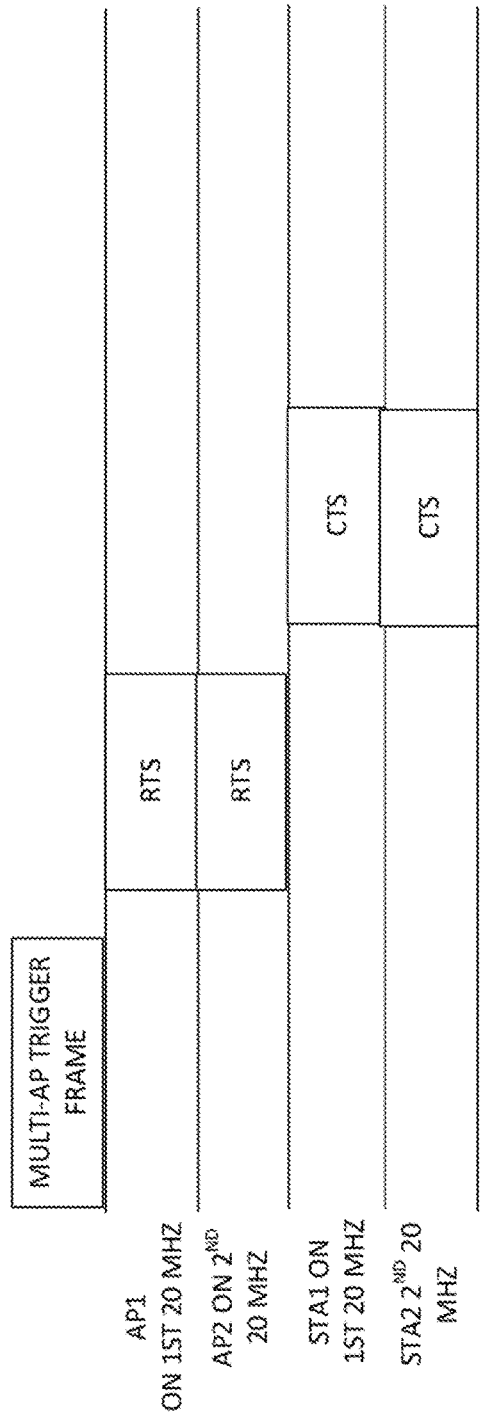
FIG. 14 illustrates a multi-user sequence, in accordance with some embodiments.

FIG. 14 illustrates a multi-user sequence 1400, in accordance with some embodiments. FIG. 14 illustrates that AP1 may operate on a first 20 MHz channel and AP2 may operate on a second 20 MHz. STA1 operates on the first 20 MHz channel and STA2 operates on the second 20 MHz channel. AP1 and AP2 may have different primary channels such as the first 20 MHz channel for AP1 and the second 20 MHz channel for AP2.

Figure 15:
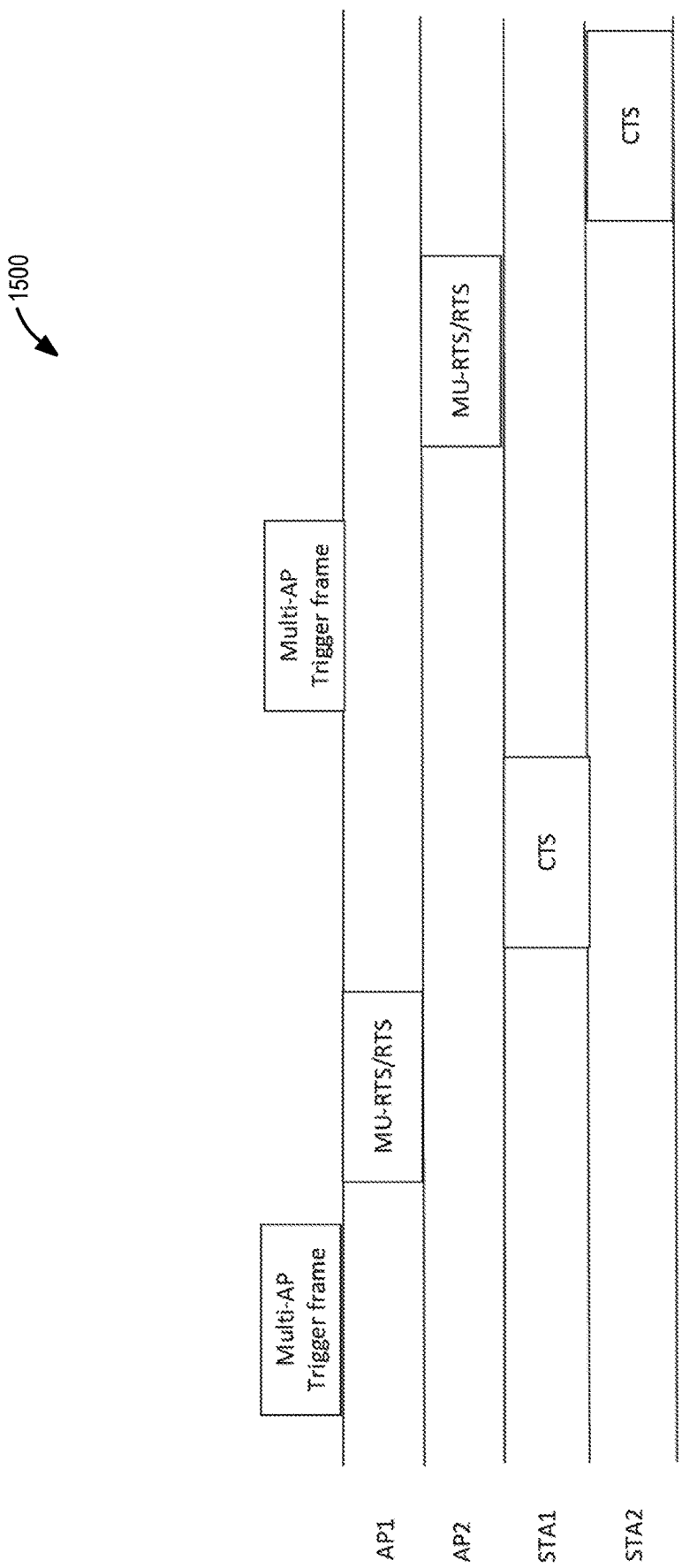
FIG. 15 illustrates multi-AP RTS/CTS transmissions, in accordance with some embodiments.

FIG. 15 illustrates multi-AP RTS/CTS transmissions 1500, in accordance with some embodiments. Illustrates in FIG. 15 is the multi-AP trigger frame being send sequentially to the different APs. For example, as illustrated, first AP1 receives the multi-AP trigger frame and sends out the MU-RTS/CTS and then AP2 receives the multi-AP trigger frame.

Figure 16:
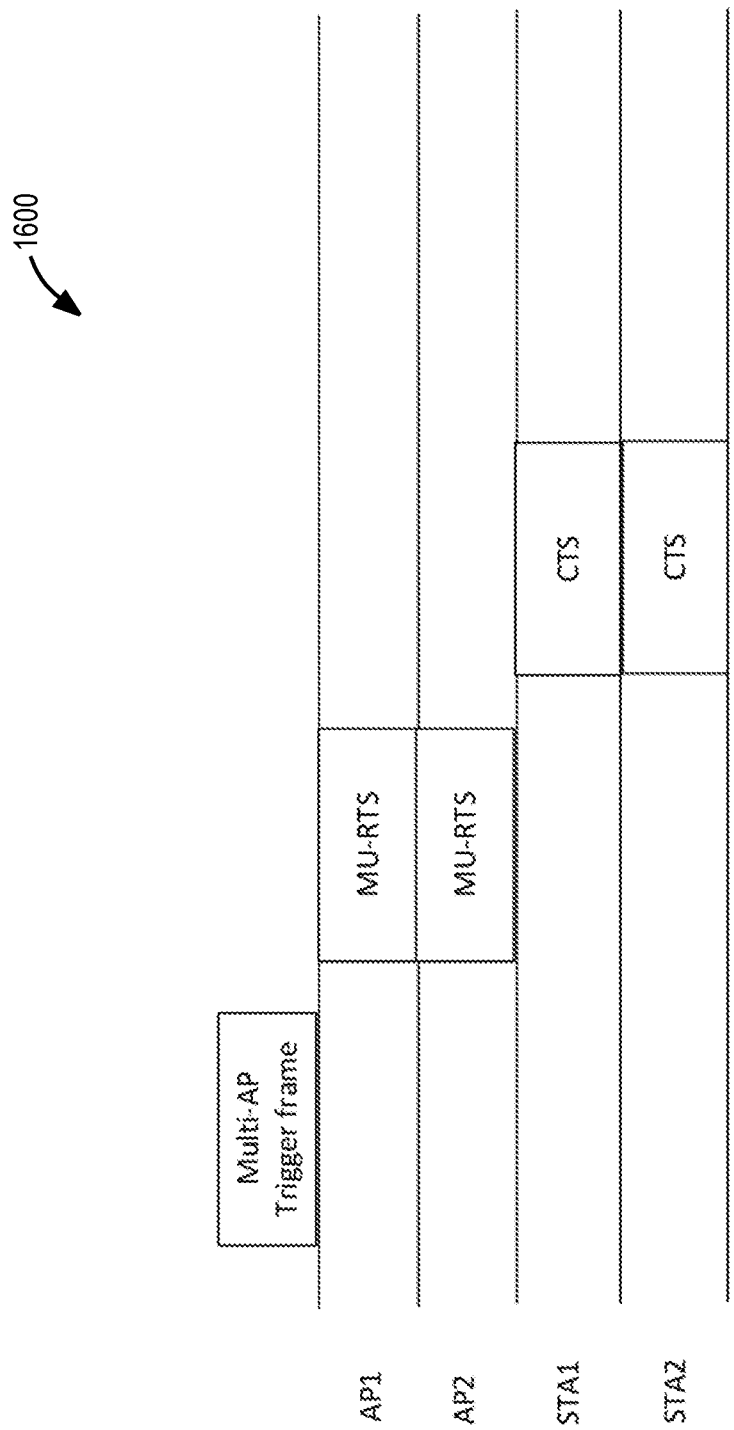
FIG. 16 illustrates multi-AP MU-RTS/CTS transmissions, in accordance with some embodiments.

FIG. 16 illustrates multi-AP MU-RTS/CTS transmissions 1600, in accordance with some embodiments. FIG. 16 illustrates that AP1 and AP2 may receive the multi-AP trigger frame (or transmit the frame) and then transmit a MU-RTS to STAs that may be associated with the AP. The STAs such as STA1 and STA2 respond simultaneously with CTSs. The timing is synchronized so that the MU-RTSs and the CTS do not interference with one another, in accordance with some embodiments. In some embodiments the MU-RTSs are encoded to a same or similar packet to lessen the interference when STAs are receiving the MU-RTSs.

Figure 17:
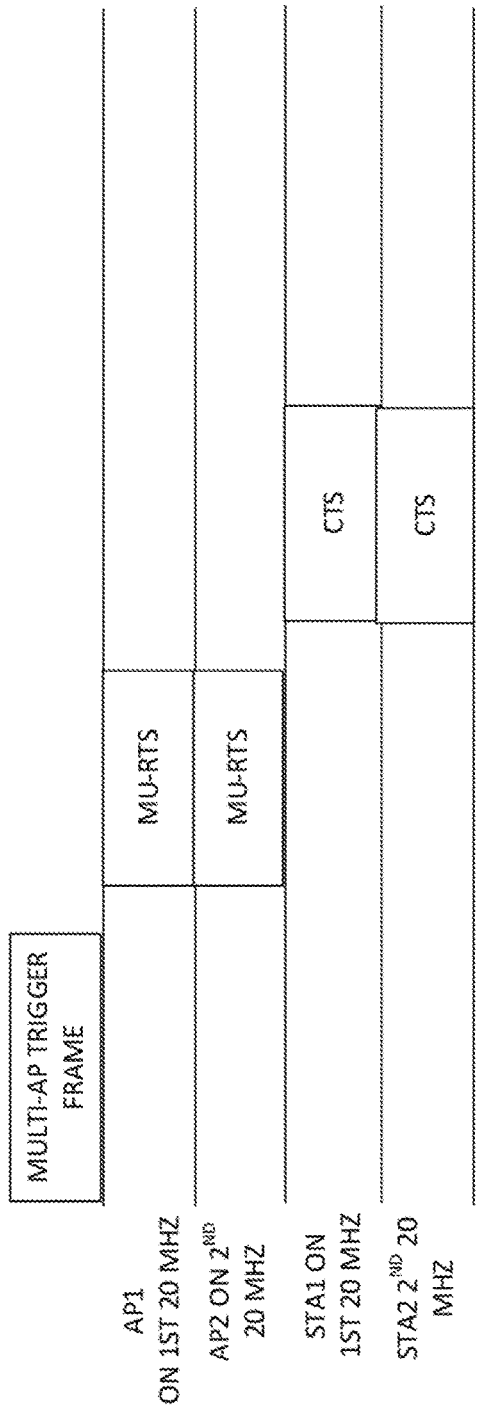
FIG. 17 illustrates multi-AP MU-RTS/CTS transmissions, in accordance with some embodiments.

FIG. 17 illustrates multi-AP MU-RTS/CTS transmissions 1700, in accordance with some embodiments. FIG. 17 illustrates that AP1 and AP2 may operate on different channels such as a first 20 MHz channel and a second 20 MHz channel. The multi-AP trigger frame may allocate the first 20 MHz channel and second 20 MHz channel, in accordance with some embodiments.

In some embodiments, the sequences disclosed herein provide protection, e.g., configuring hidden nodes to set virtual NAVs, on both transmitter side and receiver side. The sequences provide protection against legacy STA that may be part of BSS, in accordance with some embodiments. The sequences work for both downlink and uplink sequences of multi-AP transmission, in accordance with some embodiments.

Figure 18:
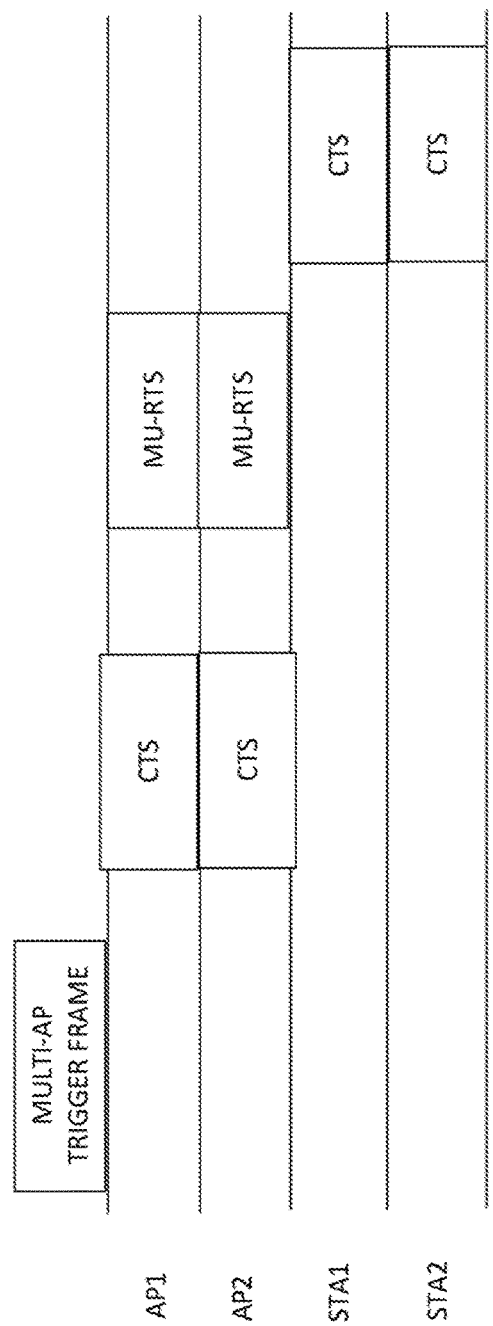
FIG. 18 illustrates a multiply APs coordination, in accordance with some embodiments.

FIG. 18 illustrates a multiply APs coordination 1800, in accordance with some embodiments. An AP, e.g., AP1, AP2, or another AP, transmits multi-AP trigger frame. The APs that receive the multiple-AP trigger frame transmit CTSs in response to the multiple-AP trigger frame and then transmit MU-RTS, which may be a form of a trigger frame for the STAs to transmit CTS. In some embodiments the multiple-AP trigger frame indicates which APs should respond and may indicate a channel bandwidth.

In some embodiments the multi-AP trigger frame indicates RTS sequence, e.g., FIG. 13 or 14 or MU-RTS sequence, e.g., FIG. 15, 16, or 17, or CTS MU-RTS/CTS sequence, e.g., FIG. 18.

In some embodiments the multi-AP trigger frame indicates which AP to join the protection sequence. In some embodiments the Multi-AP trigger frame indicates which STAs are to join the protection sequence, e.g., which STAs are the APs to indicate in the MU-RTS or RTS to transmit CTS.

In some embodiments the multi-AP trigger frame includes information to allocate or coordinate beamforming or joint transmission. In some embodiments the multi-AP trigger frame indicates the bandwidth and frequency location for which the APs are to transmit the solicited PPDU transmission after the CTSs are transmitted. In some embodiments the Multi-AP trigger frame indicates solicited PPDU transmission, e.g., uplink or downlink, parameters including one or more of the following. The PPDU format like non-HT or HE; the PPDU type like HE SU or HE MU; the PPDU modulation and coding scheme (MCS); the PPDU guard interval; the PPDU LTF type; and the PPDU PHY padding duration. In some embodiments the transmission parameters for the solicited PPDU transmission, enable the signals of the PPDU to lessen the interference of the STAs simultaneously transmitting and/or the APs simultaneously transmitting.

In some embodiments if the solicited PPDU transmission is HE, then the content of HE-SIG-A is indicated in the multi-AP Trigger frame. In some embodiments the multi-AP trigger frame includes mandatory solicited PPDU transmission parameters that may include one or more of the following: the PPDU format to be non-HT and/or the data rate to be 6 Mb/s. In some embodiments, if the solicited PPDU format is to be HE SU, then a data rate is to be MCS 0 with no DCM. The scrambler initialization value is set to copy from the multi-AP Trigger frame, in accordance with some embodiments.

The Multi-AP trigger frame indicates the transmission duration of the solicited MU-RTS trigger frame, in accordance with some embodiments. In some embodiments the transmission duration enables the triggering AP to know the end time of the MU-RTS sequence and/or for specific APs to determine which STAs to be solicited for CTS transmission, e.g., based on uplink or downlink data the STA needs.

Figure 19:
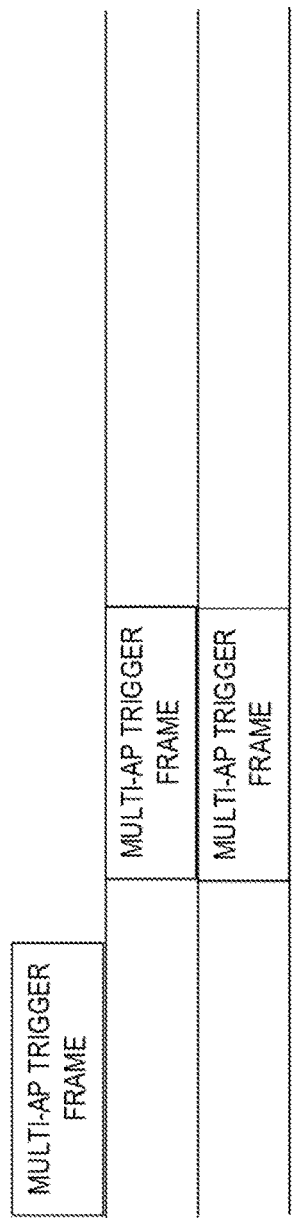
FIG. 19 illustrates the multiple AP coordination, in accordance with some embodiments.

FIG. 19 illustrates the multiple AP coordination 1900, in accordance with some embodiments. FIG. 19 illustrates that the multi-AP trigger frame may be repeated by a solicited AP before the solicited RTS or MU-RTS transmission, in accordance with some embodiments.

For the RTSs used in the sequences illustrated in FIGS. 13-18, one or more of the following may be used. The transmitter address (TA) is to be copied from the TA of the multi-AP trigger frame. The receiver address (RA) is the destined STA indicated in the multi-AP Trigger frame. The NAV duration is determined from the duration field of the Multi-AP Trigger frame. The bandwidth of the RTS transmission is indicated in the Multi-AP Trigger frame. The occupied 20 MHz channel of the RTS transmission is indicated in the Multi-AP Trigger frame, e.g. the multi-AP trigger frame may indicate which 20 MHz channels to transmit the RTS transmission and/or to solicit the CTSs.

In some embodiments, only one AP may be triggered to start the RTS sequence. The AP can select its STAs that need to be solicited for CTSs response, and only need to meet the transmission duration requirement if they need to be present. The AP is to solicit CTS only in the bandwidth used by the AP trigger frame for transmission. In some embodiments, if more than one AP are solicited to transmit on the same 20 MHz channel, then the scrambler initialization value is set to copy from the Multi-AP Trigger frame. The scrambler initialization value may include the dynamic bandwidth indication. A power management bit of the RTS frame is set to 0. More Data bit of the RTS frame is set to 0.

A CTS response follows response to RTS. The RTS and MU-RTS may include the same fields as legacy RTS and MU-RTS such as IEEE 802.11ax/n/b.

For the MU-RTSs used in the sequences illustrated in FIGS. 13-18, one or more of the following may be used. The TA is copies from the TA of the multi-AP trigger frame. The RA is the broadcast address. The NAV duration is determined from the duration field of the Multi-AP Trigger frame, e.g., the NAV duration may extend to the end of an uplink or downlink data transmission. The occupied 20 MHz channel of the RTS transmission is indicated in the Multi-AP Trigger frame. Only one AP may be triggered to start the MU-RTS sequence, in accordance with some embodiments. The AP can determine its STAs to be solicited for CTS response, and only need to meet the transmission duration requirement if present in the CTS response needed. The AP has to solicit CTS only in the bandwidth used by the AP trigger frame for transmission, in accordance with some embodiments. The AP has to solicit at least one user to transmit CTS in the 20 MHz channel used by the AP trigger frame for transmission.

If more than one AP are solicited to transmit on the same 20 MHz channel, then one or more of the following may be used. The scrambler initialization value is set to copy from the multi-AP Trigger frame; the power management bit of the RTS frame is set to 0; the more data bit of the RTS frame is set to 0; the bandwidth of the transmission and UL BW is indicated in the Multi-AP Trigger frame; the order of the user information field is indicated in the Multi-AP Trigger frame; the RU allocation of each user is indicated in the Multi-AP Trigger frame; the number of padding user info field is indicated in the Multi-AP Trigger frame; and/or other formats follow the MU-RTS.

The CTS response to a MU-RTS, may include one or more fields that are set as indicated above for the response to MU-RTS. For the CTS MU-RTS/CTS, one or more of the following may be used. The MU-RTS/CTS operation follows the design above disclosed above. The CTS transmission follows the response to MU-RTS. The scrambler initialization value is set to copy from the Multi-AP Trigger frame. A non-HT format is used. A 6 Mb/s MCS is used. The RA is copied from TA of the MU-RTS. The power management bit of the RTS frame is set to 0. The more data bit of the RTS frame is set to 0. The bandwidth is indicated in AP-Trigger frame.

In order to facilitate the CTS frame in response to the MU-RTS frame, one or more of the following may be used. The STA may identify the NAV set by MU-RTS transmission following the AP Trigger frame as Intra-BSS. The STA may identify the NAV set by the AP Trigger frame as Intra-BSS, which may include all variants of AP Trigger frame that are for protection, e.g., to solicit RTS/CTS or MU-RTS/CTS, buffer status report, channel status report and so forth.

The specific address can be allocated for the TA of AP trigger frame such that if the STA identifies the TA, then it treats the transmission as Intra-BSS. The STA does not need to look for the intra-BSS identification based on the sequence, in accordance with some embodiments. The specific address can be indicated by each AP to its associated STA, in accordance with some embodiments. A specific association identification (AID) assignment for each STA under the address is provided, in accordance with some embodiments. The additional AID, multi-AP AID assignment is indicated by each AP to its associated STA, in accordance with some embodiments. The specific address can be used in the solicited MU-RTS Trigger frame, in accordance with some embodiments.

A specific indication can be used in the solicited MU-RTS or RTS to indicate that the MU-RTS is part of a multi-AP sequence. A specific indication indicates that a specific AP or a specific STA is indicated, e.g., by an AID, MAC address, an ID assigned to the STA or AP for use for MU-RTS/CTS or RTS/CTS transmissions, and so forth. A list of AP addresses is provided by each AP to associated STA as the APs in the same multi-AP group, in accordance with some embodiments. In some embodiments this enables STAs to treat MU-RTSs or RTSs as intra-BSS transmissions for the purposes of determining whether to transmit. The STA may determine whether the RTS or MU-RTS has a TA address from the multi-AP group that the STA belongs to and then classify the RTS or MU-RTS as an intra-BSS transmission.

Figure 20:
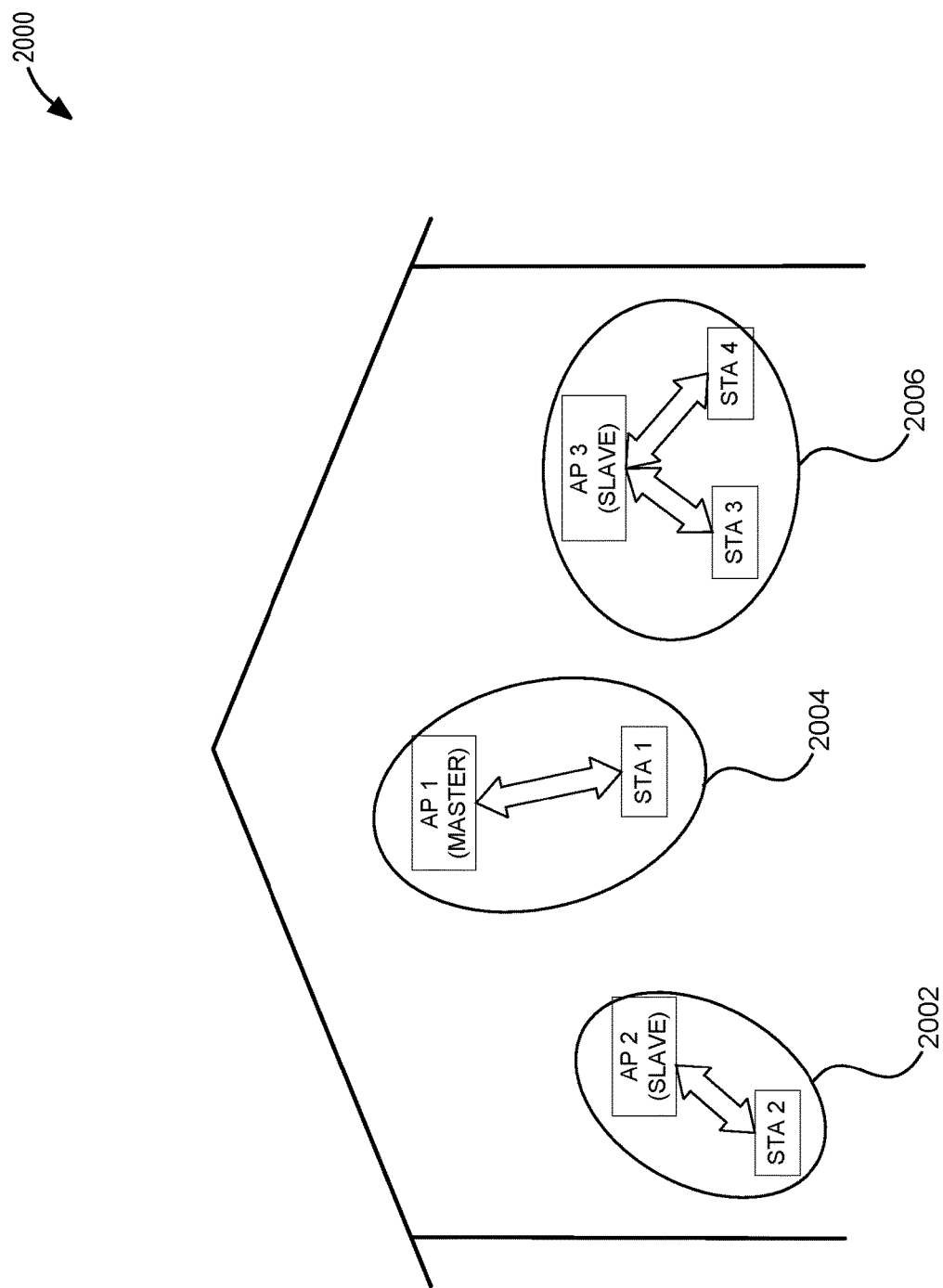
FIG. 20 illustrates multiple APs, in accordance with some embodiments.

FIG. 20 illustrates multiple APs 2000, in accordance with some embodiments. FIG. 20 illustrates a group of cooperating APs, e.g., AP1, AP2, and AP3. Often, e.g., in business environments, there are usually multiple APs, e.g., AP1, AP2, and AP3, that are controlled by a central/distributed control entity or entities, which may be co-located with one of the APs or may be connected with one or more of the APs via a wireless or wired connection. The cooperating APs may be in a home environment such as a single-family house or apartment building. Multiple APs that are cooperating may be termed IREs.

One problem the multiple-APs may have is that their signals may interfere with one another. In some embodiments, to provide a higher throughput for the wireless medium and a lower latency, the transmissions and receptions of the APs are to reduce interfering with another. When the APs are using the 6 GHz band, scheduled transmissions are used, in accordance with some embodiments. In some embodiments trigger frames are used to coordinate the transmissions and/or receptions of the APs and the STAs associated with the APs.

Illustrates in FIG. 20 is a home with three APs with AP1 a master and AP2 and AP3 slaves. Each AP has a few associated STAs. The APs can operate using the same band such as the same 80 MHz bandwidth. Instead of contending and colliding with each other, the APs can coordinate their transmissions and receptions for improving the throughput and latency. The APs have associated a radio range 2002, 2004, 2006 where STAs within the radio range may be associated with the corresponding AP. The radio range 2002, 2004, 2006 may be an 3 dimensional area where the signals are above a threshold value.

The coordination among the APs includes the synchronization of the transmissions of the devices, in accordance with some embodiments. The synchronization reduces the interferences among the APs.

Figure 21:
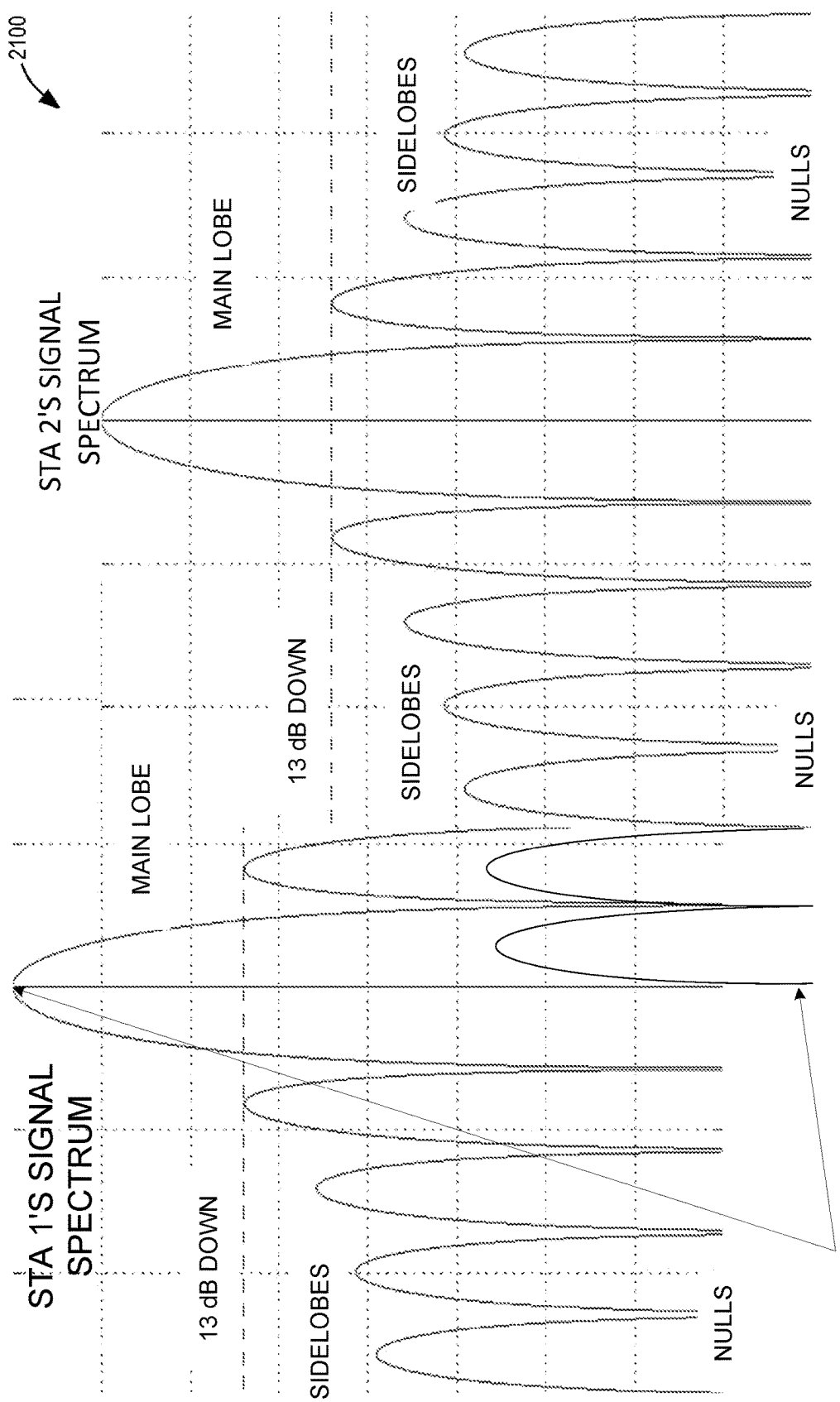
FIG. 21 illustrates synchronized signals for multiple AP coordination, in accordance with some embodiments.

FIG. 21 illustrates synchronized signals 2100 for multiple AP coordination, in accordance with some embodiments. FIG. 21 illustrates the signal spectrum of STA 1 and the signal spectrum of STA 2. STA 1's signal and the nulls of STA 2's interference with respect to STA 2, are aligned. The alignment may be within a threshold value where the threshold is based on a time differential of the nulls or peaks. In some embodiments, the nulls in frequency of a transmit device, e.g., AP or STA, are aligned with the subcarrier frequencies of another transmit device such that the devices can operate at the same band or adjacent bands. In some embodiments, two or more devices are synchronized at the OFDM symbol level. The synchronization may be coordinate by the master AP.

In some embodiments trigger frames are used for coordination where the format of the trigger frame may be based on the format of the trigger frame used in IEEE 802.11ax. In some embodiments, such as for home environments, a master AP controls one or several slave APs. In some embodiments, two tiers of polling and scheduling are performed one for the slave APs and the other for the STAs of each scheduled AP. In some embodiments, an implementation trigger is used, which may be based on a physical (PHY) level such as an OFDM symbol, for synchronization and coordination of multiple APs. The master AP may transmit a trigger frame, which may configure slave APs, other master APs, and STAs to coordinate one or more of the following: the preamble of a PPDU in accordance with a preamble type, preamble duration, and so forth; the payload of the PPDU in accordance with an OFDM symbol formation, cyclic prefix (CP), HE long-training field (LTF), resource unit (RU) usage, RU power, RU MCS/number of spatial streams (NSS), packet extension, and so forth; and, the frequency and time offsets such as subcarrier position and timing, and so forth.

The trigger frame includes fields for coordination that configure the APs and STAs for a PHY level synchronization. The master AP may encode the trigger frame with information based on reports and measurements that are provided to the master AP from the slave APs and/or STAs to the master AP. The master AP and slave AP may be an EHT AP 502 and the STAs may be EHT STAs 504.

The APs and STAs are configured by the trigger frame to simultaneously transmit with one another so that there is a PHY level synchronization where the subcarrier frequencies are synchronized with another. The APs and STAs may transmit on a same band or adjacent bands, in accordance with some embodiments.

The OFDM symbol level synchronization and coordination enable synchronization at the OFDM symbol level by providing means for frequency and time offsets correction and OFDM symbol boundaries alignments. There are multiple available OFDM symbol durations due to different CP lengths, so the master AP choses the same CP for all APs and STAs, in accordance with some embodiments. There are two or more OFDM symbol durations such as 1× and 4×, which are used by the preamble portion and the data portion of the PPDU, respectively, and the preamble length (e.g. the one for HE-SIG-B) is variable. The master AP may encode the trigger frame to indicate a symbol duration and preamble length, in accordance with some embodiments.

Figure 22:
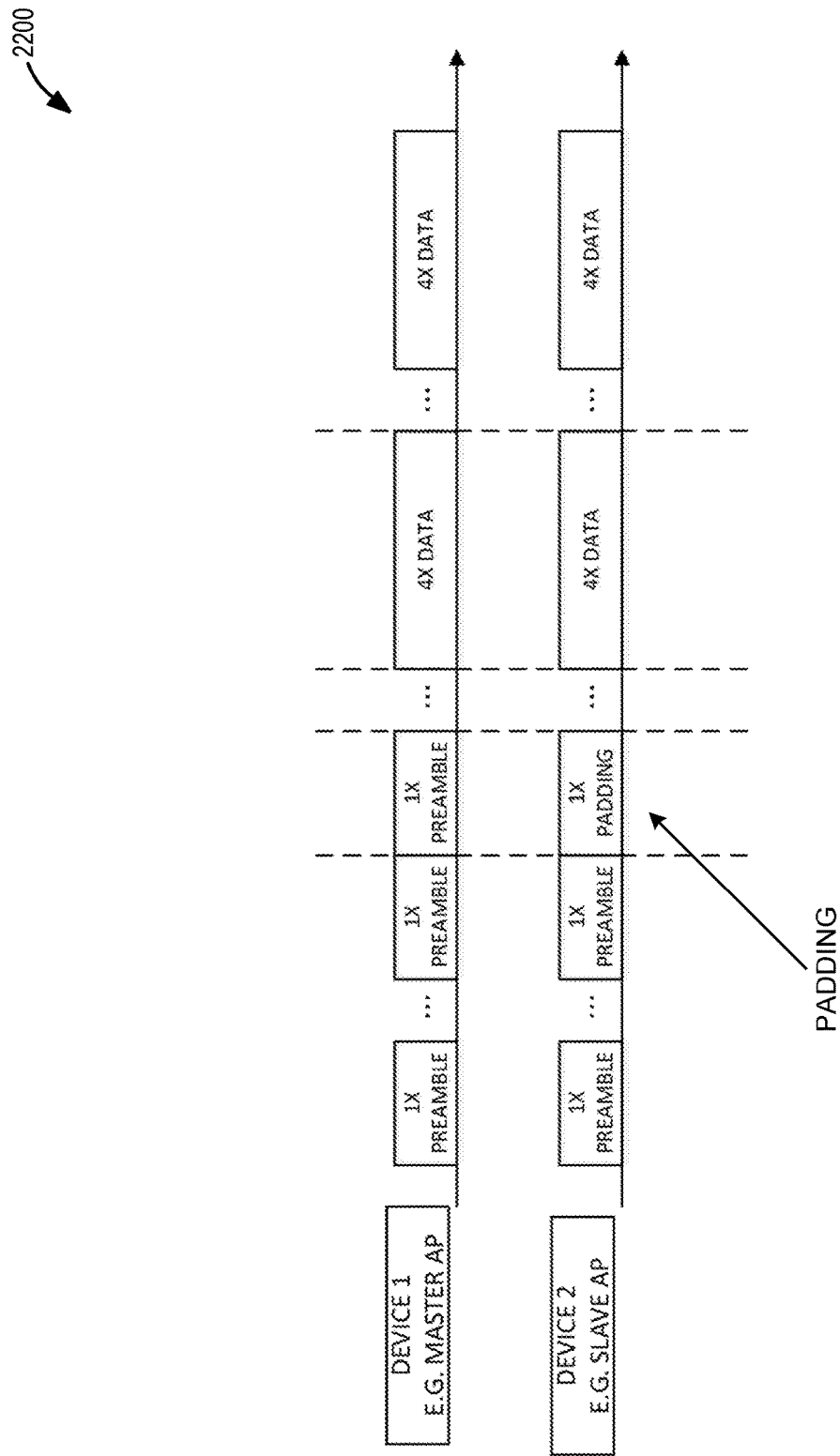
FIG. 22 illustrates coordinated preambles, in accordance with some embodiments.

FIG. 22 illustrates coordinated preambles 2200, in accordance with some embodiments. The master AP may encode the trigger frame for coordinated preambles. The trigger frame coordinates the channel training fields such as a L-LTF, HE-LTF, EHT-LTF, L-STF, HE-STF, and EHT-STF to be synchronized, in accordance with some embodiments. The channel training field such as a HE-LTF has three symbol durations 1×, 2×, and 4×. The cyclic prefix of channel training field such as an HE-LTF or EHT-LTF has three symbol durations 0.8, 1.6, and 3.2 microseconds. The short training field (STF) may only have one duration 0.8 microsecond. The data symbol has a symbol duration 4× with three different cyclic prefix durations 0.8, 1.6, and 3.2 microseconds, respectively. In some embodiments, the trigger frame coordinates the preamble durations of the APs and STAs for coordinated transmission to minimize the interferences among the APs and STAs. The APs and STAs may be configured to add padding to the preambles to align the start and termination of one type of symbol duration.

Illustrated in FIG. 22 are device 1 and device 2 each transmitting a PPDU that includes a preamble and data portion. As illustrated in FIG. 22 device 1 and device 2 transmit preambles so that the different portions of the preambles start and end at the same time. Time progresses from left to right horizontally. Device 2 transmits 1× padding to extend the preamble portion to end at a same time as device 1. The alignment error of the symbol boundaries across multiple APs and/or STAs is less than the CP, cyclic prefix, duration, in accordance with some embodiments.

Additionally, device 1 and device 2, which may be STAs and/or APs, also synchronize the start time of transmitting the PPDUs such as is performed with trigger frames where a start time for a transmission is indicated by the reception of the trigger frame, e.g., to begin transmitting a short interframe space after receiving the trigger frame. In 11ax, one AP and multiple STAs perform multiuser communications. In some embodiments, STAs transmit preambles in response to a trigger frame that are exactly the same, which is specified by the trigger frame sent by the AP. In some embodiments, the preambles of the slave APs and their STAs are different than other slave APs and their STAs or the master AP and its STAs. For example, the payloads in the SIGNAL fields such as HE-SIG-B in the preambles are different for different APs and/or STAs. The payloads may have different lengths. Padding may be needed in this case. For another example, the numbers of long-training filed symbols such as HE-LTF symbols or EHT-LTF symbols are different for different APs and/or STAs. Padding may be employed in this case as well. If padding is not used, the different APs and/or STAs may use P-matrix codes of the same length to encode the long training field so that the number of long training filed (LTF) symbols is the same for all simultaneously transmitting devices, i.e. APs and/or STAs. Even though some AP or STA can use a smaller number LTF symbols, e.g., 4 if the AP or STA doesn't participate in the transmissions coordinated by the multiple APs, the AP or STA may use a larger number of LTF symbols, e.g., 8 for joining the simultaneous transmissions by aligning the long training field duration. The padding and other coordination information permits the preambles to be different but to be aligned with one another, in accordance with some embodiments.

Figure 23:
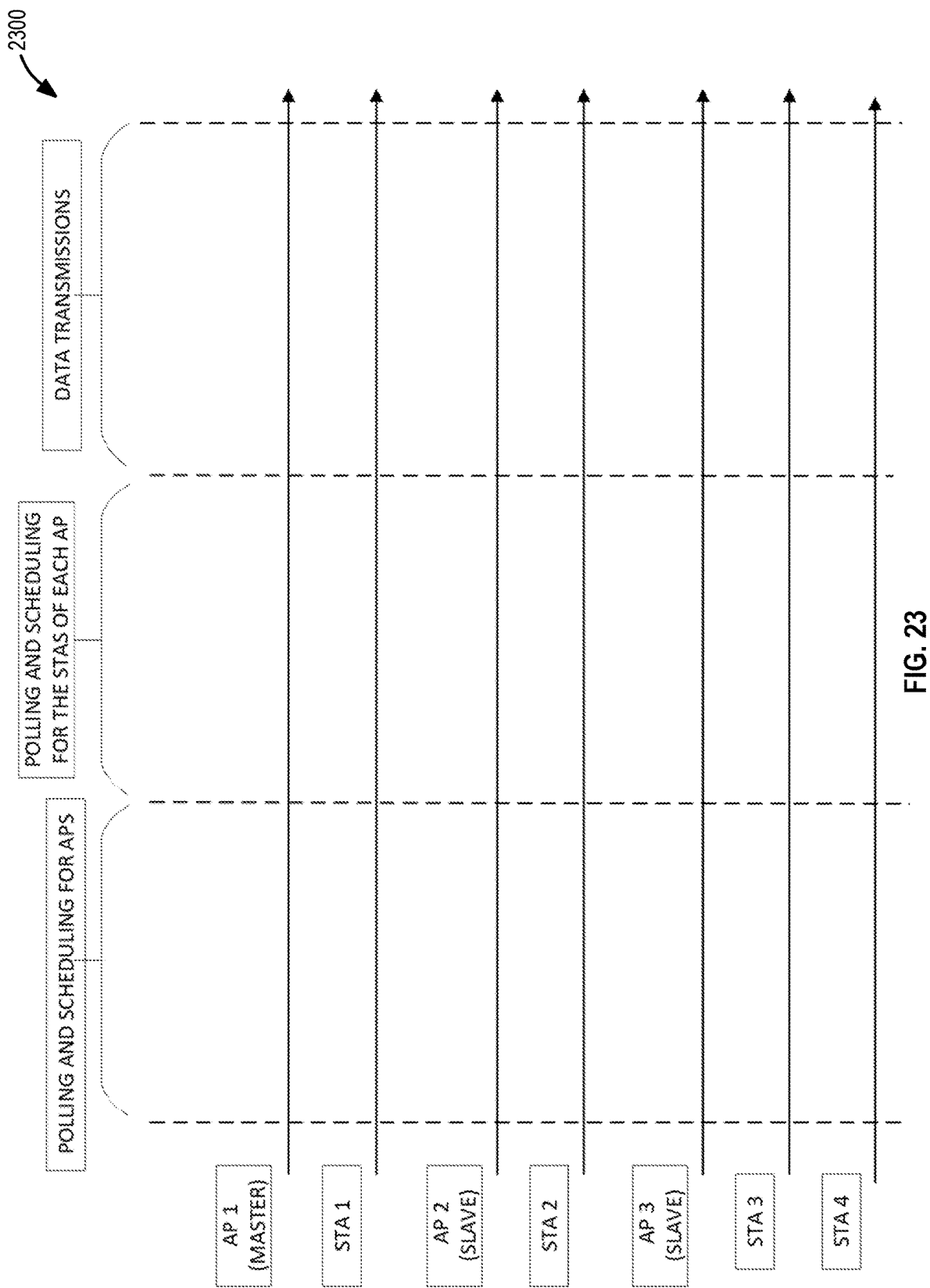
FIG. 23 illustrates phases of coordination, in accordance with some embodiments.

FIG. 23 illustrates phases of coordination 2300, in accordance with some embodiments. The master AP polls the slave APs to determine which of the slave APs is ready to transmit or receive. The master AP and/or slave AP needs to know which of its STAs are ready to communicate. In some embodiments, there are two levels of polling/scheduling one for the AP and the other for the STA. The master AP polls the slave APs and the slave APs poll their respective STAs. In some embodiments, as illustrated in FIG. 23, there are three phases: polling/scheduling for APs, polling/scheduling for STAs, and data transmission.

Figure 24:
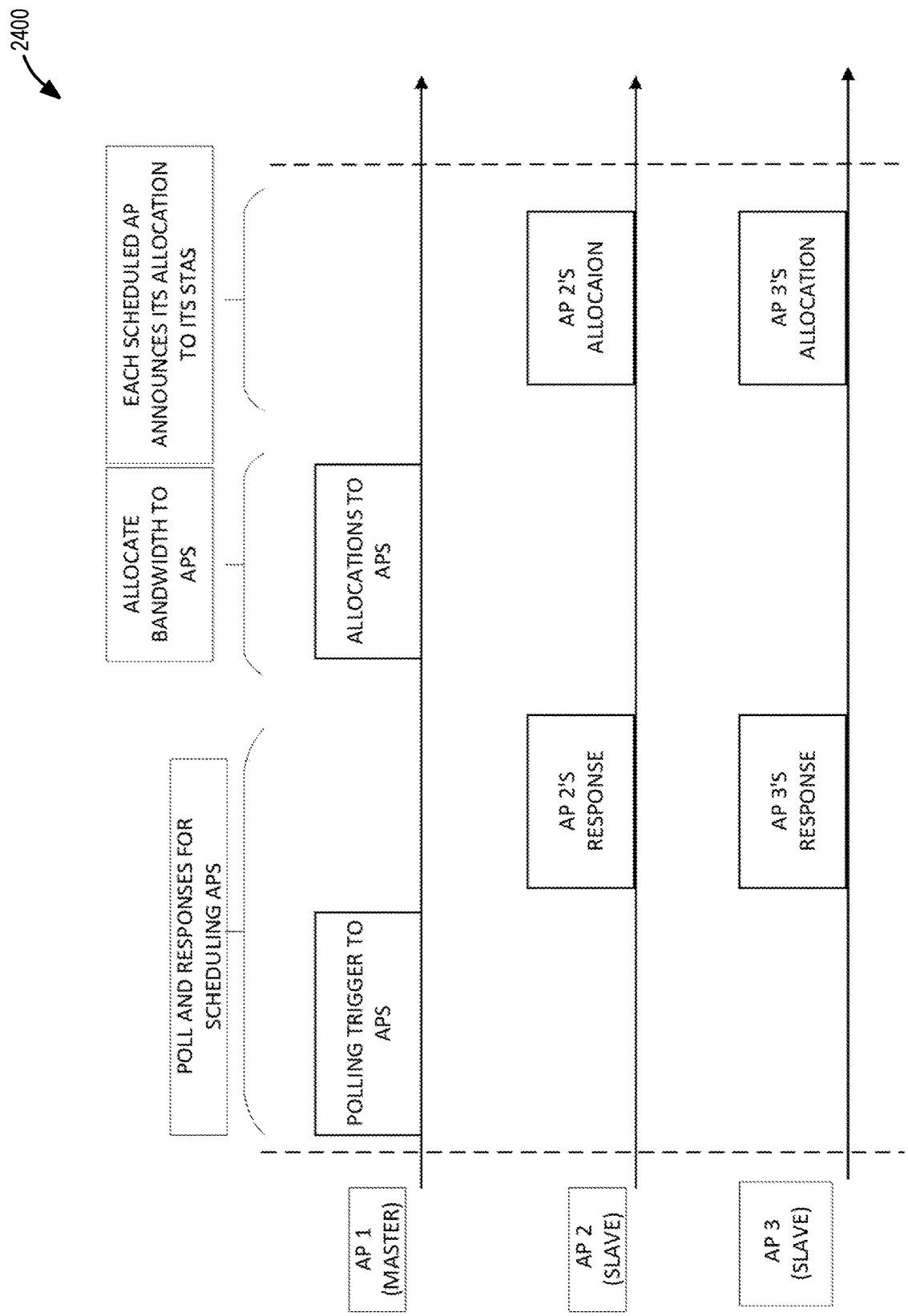
FIG. 24 illustrates polling and scheduling of APs, in accordance with some embodiments.

FIG. 24 illustrates polling and scheduling of APs 2400, in accordance with some embodiments. FIG. 24 illustrates polling and scheduling of the APs. The master AP first sends a polling trigger frame to the slave APs to solicit responses from the slave APs as to whether they would like an allocation of resources. The polling trigger frame may be a different type of frame, in accordance with some embodiments. In some embodiments, the slave APs may indicate a request for an allocation in a different way such as in a previous response to the master AP. The polling trigger frame may solicit null-data packet (NDP) short feedbacks from the slave APs or may solicit OFDMA random access feedbacks, in accordance with some embodiments. After receiving the availability feedback from the slave APs, the master AP determines an allocation to allocate resources to the available slave APs by sending one or multiple allocation frames. The allocations may be specified in the preamble such as a HE-SIG-B or a MAC header or in the frame payload, e.g., as the data portion, such as the trigger frame payload. After receiving the allocations, the slave AP may forward its allocation to its STAs such that its STAs knows where to operate for the subsequent data communication phase. The allocation from the AP to the slave APs may be a trigger frame. The polling trigger to APs and the allocation to APs may include synchronization information as disclosed herein such as CP synchronization.

In some embodiments there are two levels of configuration for the primary channels of the APs. The first primary channel is for the communications among the APs and a second primary channel is for each AP to communicate with its STAs. In some embodiments, a common primary channel is used for all APs and all STAs. In another embodiment, the slave APs may use different primary channels to communicate with their STAs. In yet another embodiment, a slave AP may use two different primary channels to communicate with the master AP and with its associated STAs, respectively. In yet another embodiment, a slave AP may use one primary channel to communicate with the master AP and the slave AP's STAs. In this embodiment the AP doesn't need to monitor two primary channels.

The polling trigger and the allocation frame is sent over the primary channel of a slave AP so that the slave AP receives them due to monitoring its primary channel, in accordance with some embodiments. In some embodiments, the preamble of the polling trigger and/or allocation frame is sent over the primary channel of the slave AP such that the slave AP can detect and demodulate the preamble and may continue to demodulate the data portions of the frames. In some embodiments, the polling frame and the allocation frame are transmitted in a 20 MHz bandwidth and repeated in every 20 MHz subchannel of the band, e.g., 40 MHz, 80 MHz, 160 MHz, 320 MHz, etc., which enables the slave AP to receive the frame no matter which channel is the primary channel of the slave AP. In another embodiment, the master AP sends the polling trigger and the allocation information to the slave APs using multiuser mode, such as IEEE 802.11ax MU mode.

After receiving the allocation frame, the slave APs configure their associated STAs so that their STAs know where to receive or transmit frames in the subsequent phase. The allocation may be specified in the preamble such as HE-SIG-B, MAC header, or the frame payload such as a data portion of the MAC portion.

In some embodiments, the STA of the slave AP does not receive the master AP's allocation frame because the STA may be hidden from the master AP, e.g., out of a transmission range, or the STA may not be monitoring a channel where the master AP transmits the allocation of the BW to the slave APs. The slave AP configures their STAs with allocation information based on the allocation from the master AP.

Since the STA may only monitor the primary channel specified by its AP, which may be a slave AP or master AP, a preamble signal needs to be sent over the primary channel such that the STA can detect and demodulate the allocation. If the complete allocation information is carried by the preamble, no MAC payload is needed. The allocation for the slave AP may temporarily change the primary subchannel monitored by the slave AP's STAs. For example, the allocation may indicate that the secondary 20 MHz channel is allocated to the slave AP. The STAs of the slave AP may then monitor the secondary 20 MHz channel instead of the primary 20 MHz channel for the transmission opportunity (TXOP) specified by the slave AP's allocation frame. The AP's allocation frame may indicate a duration of the TXOP, which may include one or more of a duration for the slave APs to decode the allocation to APs frame, to transmit the APs allocation, a response from the STAs, and a response to the STAs from the APs. The master AP transmits an allocation to its STAs simultaneously with the slave APs, in accordance with some embodiments.

In some embodiments, the scheduled slave APs transmit allocation information over multiple 20 MHz subchannels in the band. In some embodiments, the scheduled slave APs transmit the allocation information over each of the 20 MHz subchannels of the band. In another embodiment, each slave AP uses a different 20 MHz subchannel to transmit its allocation information to its STAs. In another embodiment, multiple scheduled slave APs share the same 20 MHz primary channel and transmit simultaneously, which may be coordinated as disclosed herein, e.g., such as a fixed preamble duration. In some embodiments, allocation information for all the STAs is transmitted by all the scheduled APs. For example, each AP sends the allocation information from all scheduled APs sharing the same primary subchannel. In another embodiment, multiple scheduled slave APs share the same 20 MHz primary channel. The slave APs use different spatial streams of the primary channel, which may be by the slave AP, to transmit the allocation information to the STAs. Each slave AP transmits the allocation information for its STAs using its assigned spatial streams. In another embodiment, the scheduled slave APs forward the allocation frame sent by the master AP using the same signal format and transmit simultaneously.

Figure 25:
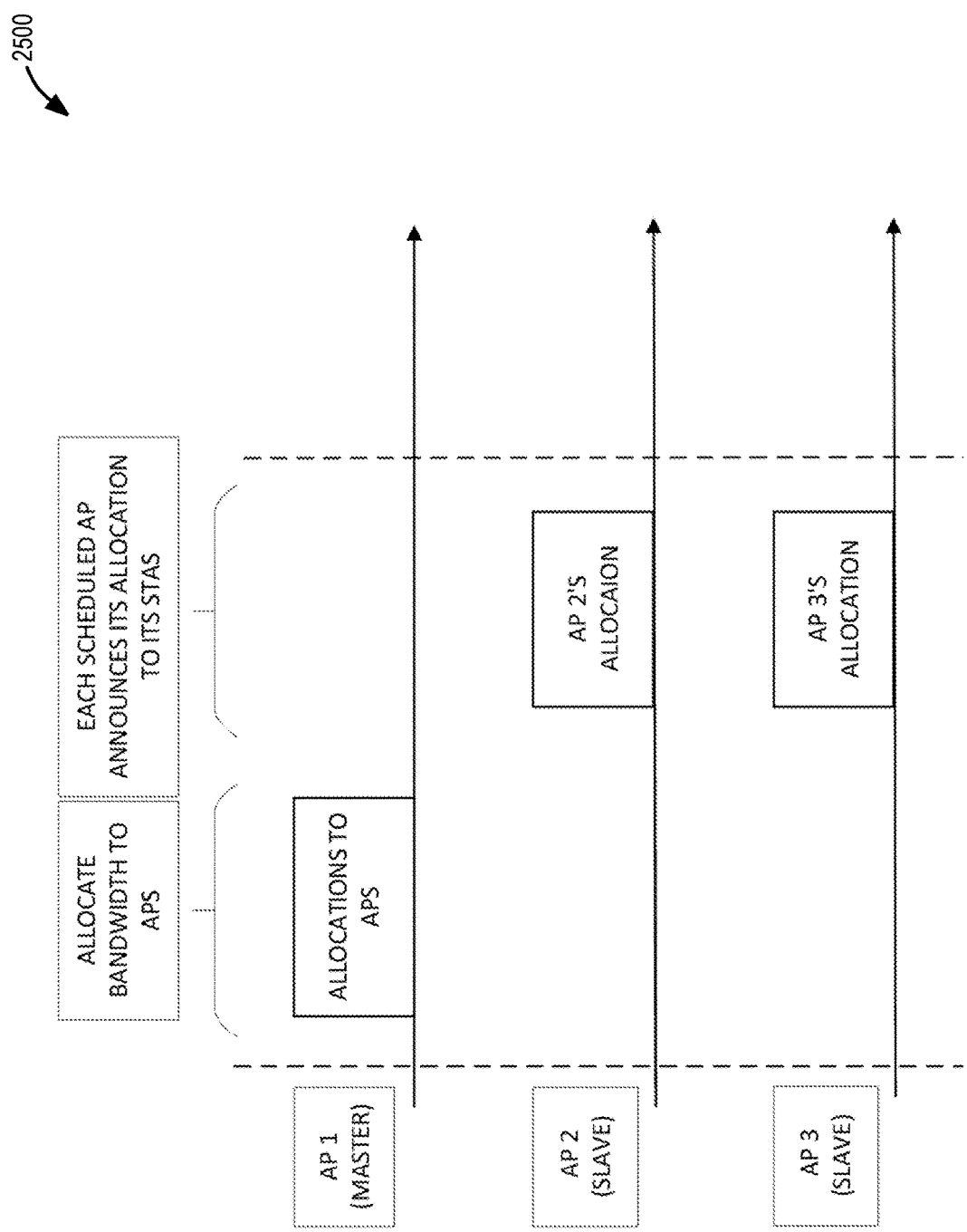
FIG. 25 illustrates polling and scheduling of APs, in accordance with some embodiments.

FIG. 25 illustrates polling and scheduling of APs 2500, in accordance with some embodiments. In some embodiments, the 4-step sequence of FIG. 24 is reduced to the two-step sequence of FIG. 25. The polling and scheduling for the slave APs may be combined. The master AP sends resource allocations to the slave APs without a poll and waits for the slave AP to transmit their allocation to the their STAs. If the scheduled slave AP's allocation is not detected by the master AP, the master AP assumes the slave AP is not ready and the master AP may retrieve the resource allocated to the slave AP and use it for the master AP's own traffics in the subsequent phase.

The master AP determines which scheduled slave APs transmitted the slave AP's allocation to their STAs based on being able to distinguish the allocations from the slave APs to their STAs. In some embodiments, the slave APs uses different 20 MHz subchannels, which may be their primary channels, to forward the allocation information to their STAs. When a scheduled slave AP forwards its allocation information, it sends the allocation information over its primary 20 MHz such that its STAs can receive the allocation information and the master AP can detect the forwarding transmission. In another embodiment, the master AP allocates different spatial streams on the same channel to the slave APs and the master AP can determine which slave AP transmitted the allocation information based on the spatial stream used for the transmission.

The processing of the received frames incurs latency, such as polling trigger frame or one of the other frames, so a packet extension is added to the frame to give the receiving AP or STA time. If the packet extension, which is up to 16 microseconds, is not enough, an additional frame may be transmitted exchange sequence. For example, an ACK frame may be sent by the slave APs right after the allocation frame sent by the master AP.

Figure 26:
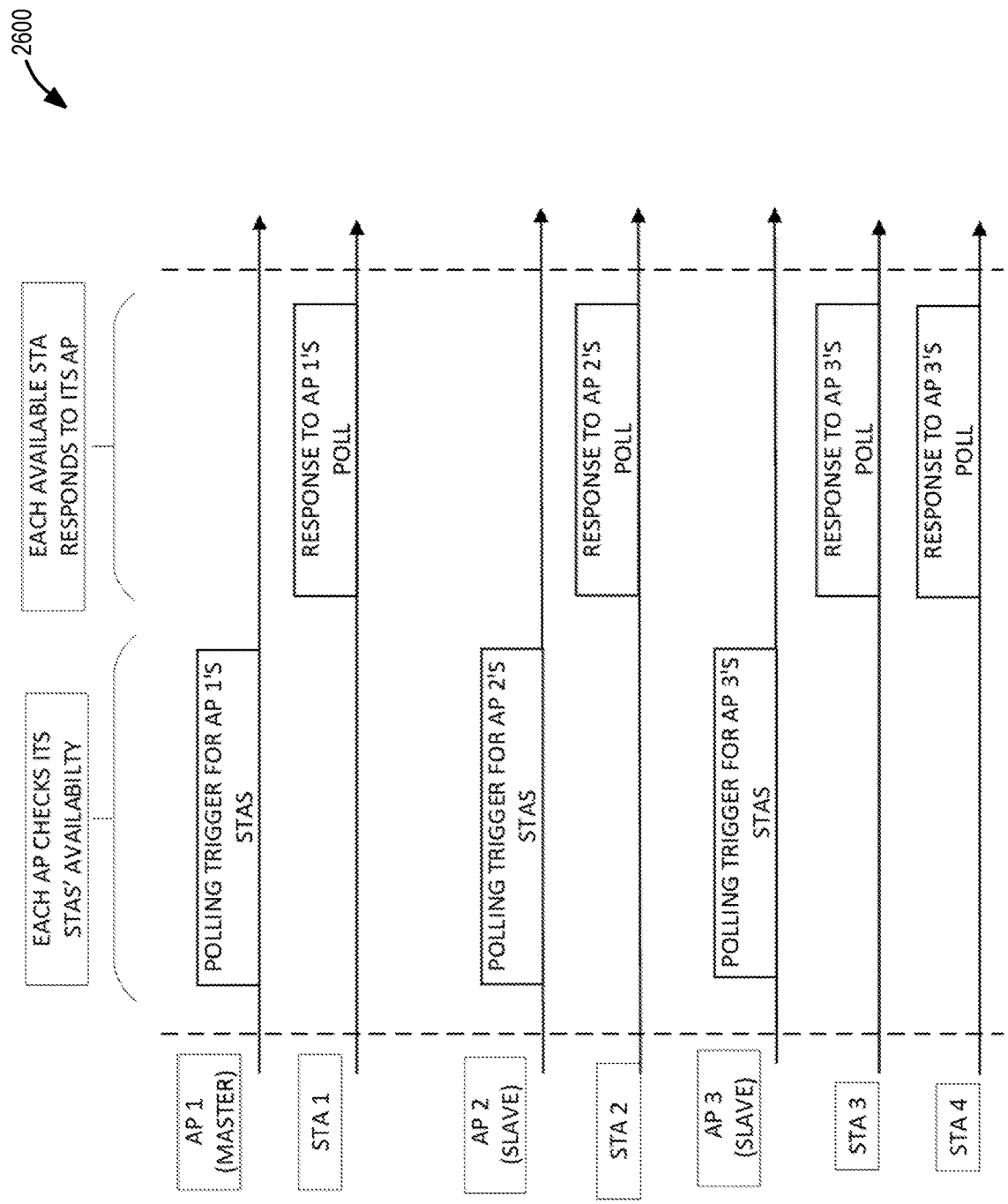
FIG. 26 illustrates APs polling their STAs, in accordance with some embodiments.

FIG. 26 illustrates APs polling their STAs 2600, in accordance with some embodiments. After the resource allocation frame to the slave APs is transmitted, the master AP and the scheduled APs may need to schedule the communications with its STAs. The scheduled slave APs and the master AP may poll their STAs for availability as illustrated in FIG. 26. OFDMA random access and/or NDP short feedback is used for the polling, in accordance with some embodiments. To lessen the interference among the APs and STAs, the symbol boundaries of the transmitting APs and STAs may be aligned. After receiving the poll responses from the STAs, the APs go into the data transmission phase, in accordance with some embodiments. The polling to the STAs may is not performed and the scheduled slave APs and the master AP may directly go to the data transmission phase without the polling, in accordance with some embodiments.

In the data transmission phase, the APs send data to or receive data from the STAs. In one embodiment, the APs send downlink data simultaneously to their STAs. After the downlink data transmissions, they receive the acknowledgements from the STAs simultaneously, in accordance with some embodiments. In another embodiment, the APs send trigger frames to their STAs for soliciting uplink transmissions.

Figure 27:
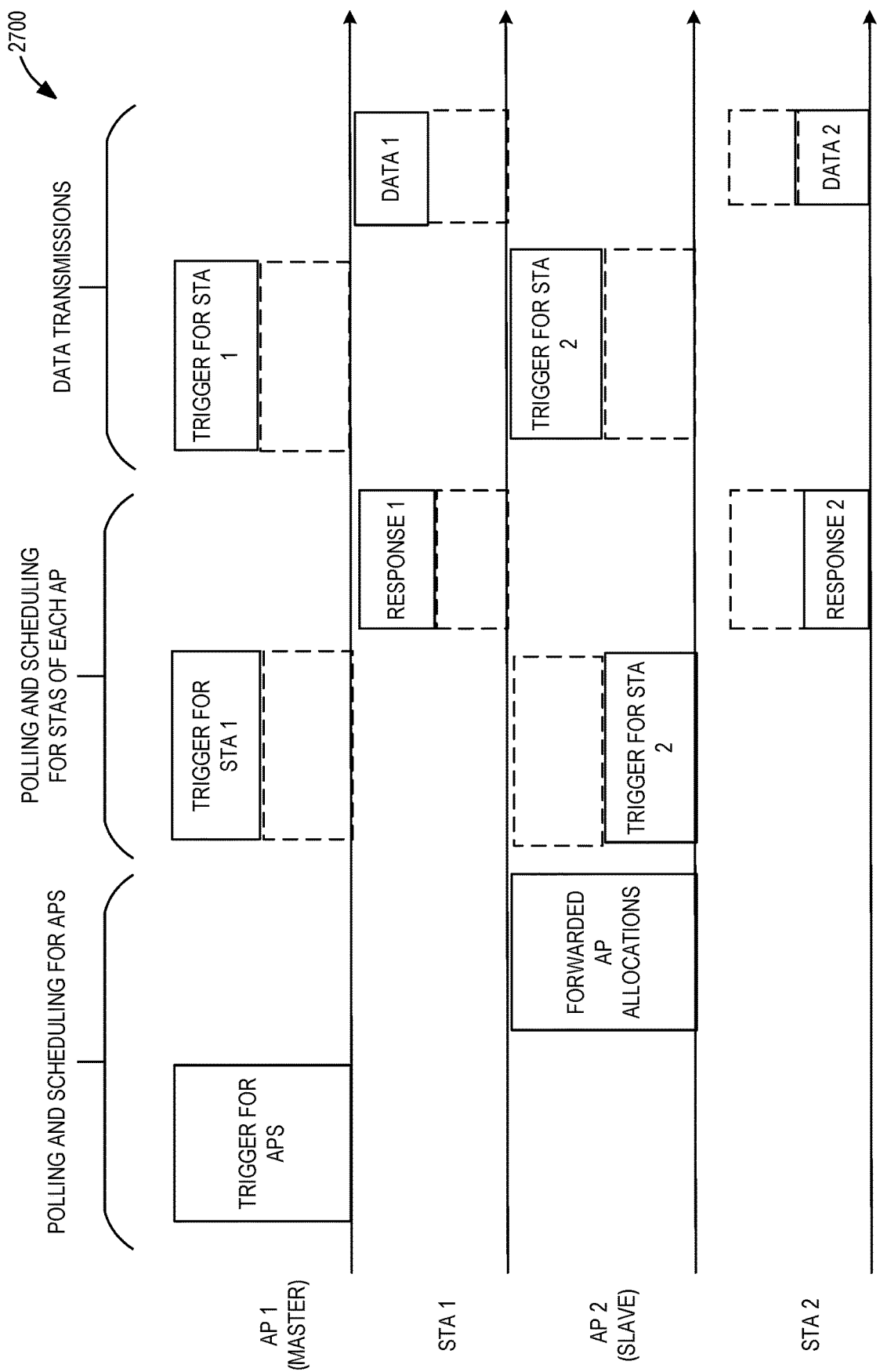
FIG. 27 illustrates coordinated uplink data transmissions, in accordance with some embodiments.

FIG. 27 illustrates coordinated uplink data transmissions 2700, in accordance with some embodiments. After the triggers for STAs, the STAs may send data to their APs simultaneously. After receiving the uplink data, the APs may send acknowledgements to the STAs simultaneously. In another embodiment, some of the APs may include downlink data transmissions with the trigger for STAs. In some embodiments, some of the AP may perform downlink data transmission to the STAs while other APs transmit trigger for STAs and receive uplink data from the STAs. In some embodiments, the APs align the boundaries of the data symbols. For example, while a first AP sends a trigger frame to solicit its STAs' uplink transmissions, a second AP that will do a downlink data transmission also sends a short frame to align the timing with the first AP sending the trigger.

The indication of the uplink/downlink switch timing, trigger/poll/response durations, and the symbol boundary alignment is specified in the trigger frame, the polling frame, and/or allocation frame sent by the master AP and is forwarded by the slave APs to their STAs, in accordance with some embodiments. In some embodiments, one or more of the synchronization or coordination parameters is transmitted as part of set-up parameters. The slave APs encode a new frame such as the trigger for STAs frame that includes the synchronization or coordination information, in accordance with some embodiments.

Figure 28:
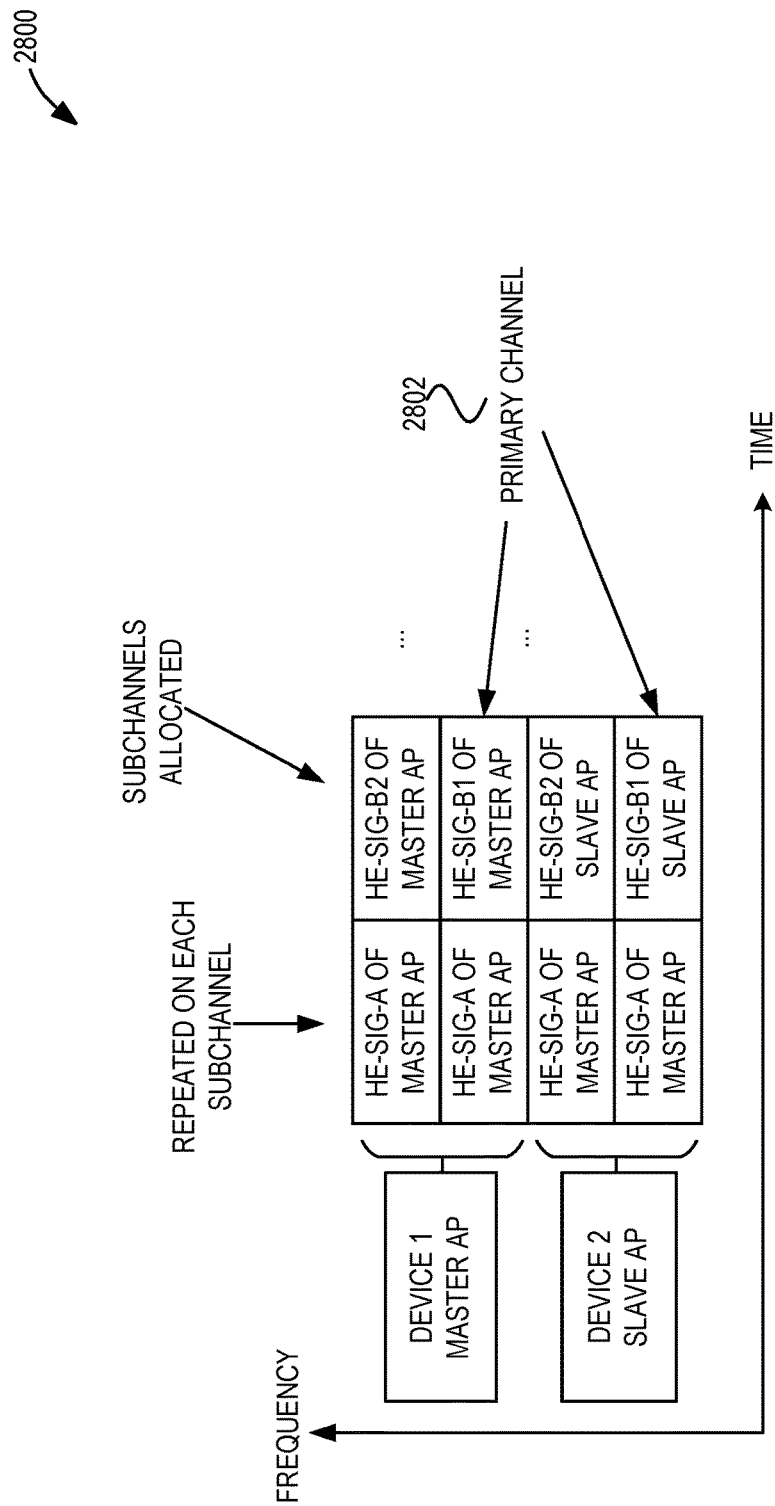
FIG. 28 illustrates a modified bandwidth and primary channel, in accordance with some embodiments.

FIG. 28 illustrates a modified bandwidth and primary channel 2800, in accordance with some embodiments. In some embodiments, the HE-SIG-A is the same for all 20 MHz subchannels in the band. In some embodiments, the subchannels are allocated differently. In the data transmission phase, the band may be divided into subbands or subchannels, which are allocated to different APs. Each scheduled AP reduces the bandwidth down to their allocated subband, in accordance with the allocation trigger.

In some embodiments, a primary subchannel inside the allocated subband may be specified. The subband allocation and the primary subchannel may be specified in the allocation frame sent by the master AP to the slave APs and/or the forwarded allocation frame sent by slave APs to the STAs and/or any frame sent by the master AP or the slave APs. For example, the HE-SIG-A of a scheduled AP can only repeat within the allocation subband. If the HE-SIG-B is used for multiuser operation, the HE-SIG-B content channels such as channels 1 and 2 are also repeated within the allocated subband, in accordance with some embodiments. As illustrated in FIG. 28 each of the subchannels is 20 MHz and 2802 is the primary channel of the master AP. The HE-SIG-A may be an EHT-SIG-A, in accordance with some embodiments.

Figure 29:
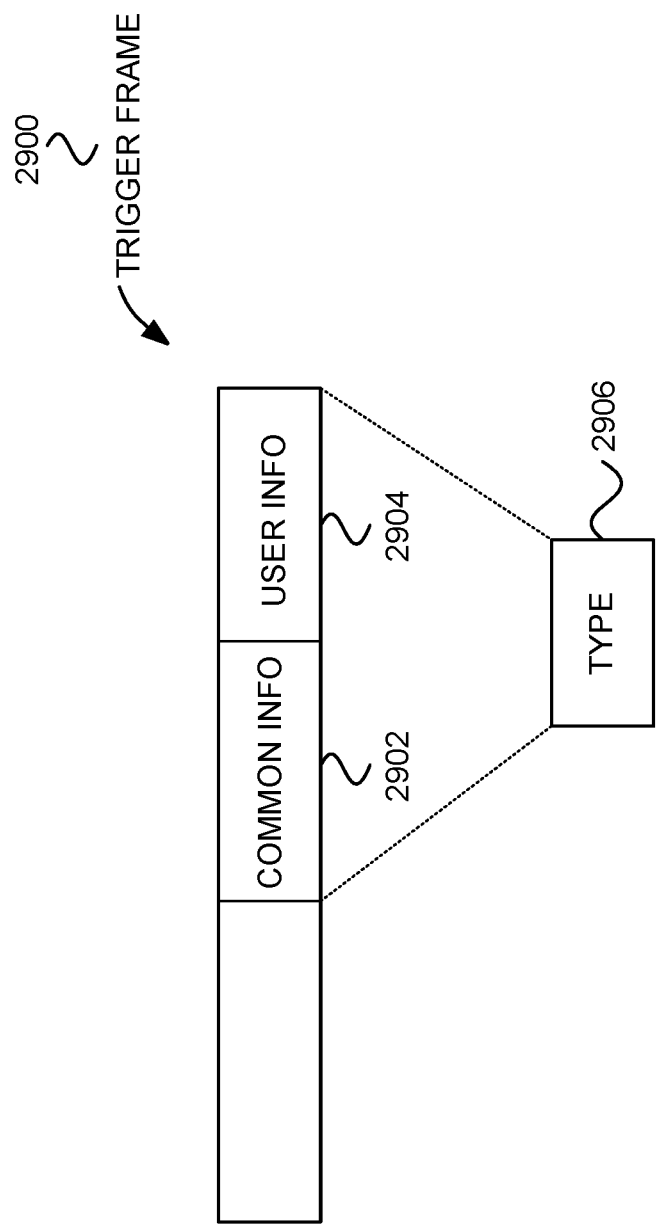
FIG. 29 illustrates a trigger frame, in accordance with some embodiments.

FIG. 29 illustrates a trigger frame 2900, in accordance with some embodiments. The trigger frame 2900 may be an AP trigger frame, e.g., a trigger frame for an AP to transmit to other APs, or a trigger frame for an AP to transmit to STAs. The trigger frame 2900 may include a type 2906, which may indicate whether the trigger frame 2900 is an AP trigger frame or trigger frame for APs to transmit to STAs. The trigger frame 2900 may include common information (INFO) 2902 and user info 2904. In some embodiments, the common info 2902 and user info 2904 includes a resource allocation for other APs to transmit data frames or trigger frames to stations and for the stations to transmit to the APs. The common info 2902 and user info 2904 include information for the transmission to be coordinated at a physical level. In some embodiments, the common info 2902 and user info 2904 include one or more of the following information that is indicated in one or more fields: a preamble type, a preamble duration, an indication of an OFDM symbol duration, an indication of an OFDMA symbol duration, an indication of a cyclic prefix (CP), an indication of a long-training field duration, an indication of a short-training field duration, an indication of a resource unit (RU) usage, e.g., an indication of a channel or bandwidth to use for transmissions, an indication of a RU power, an indication of a modulation and coding scheme (MCS), an indication of a number of spatial streams, an indication of the allocated spatial streams, an indication of a packet extension format, a frequency offset, a time offset, an indication of a subcarrier position, and an indication of a timing format. One or more of the common info 2902 and user info 2904 may be determined based on a wireless standard and/or may be determined in accordance with set-up or operational parameters that are exchanged prior to the transmission of the AP trigger frame.

Figure 30:
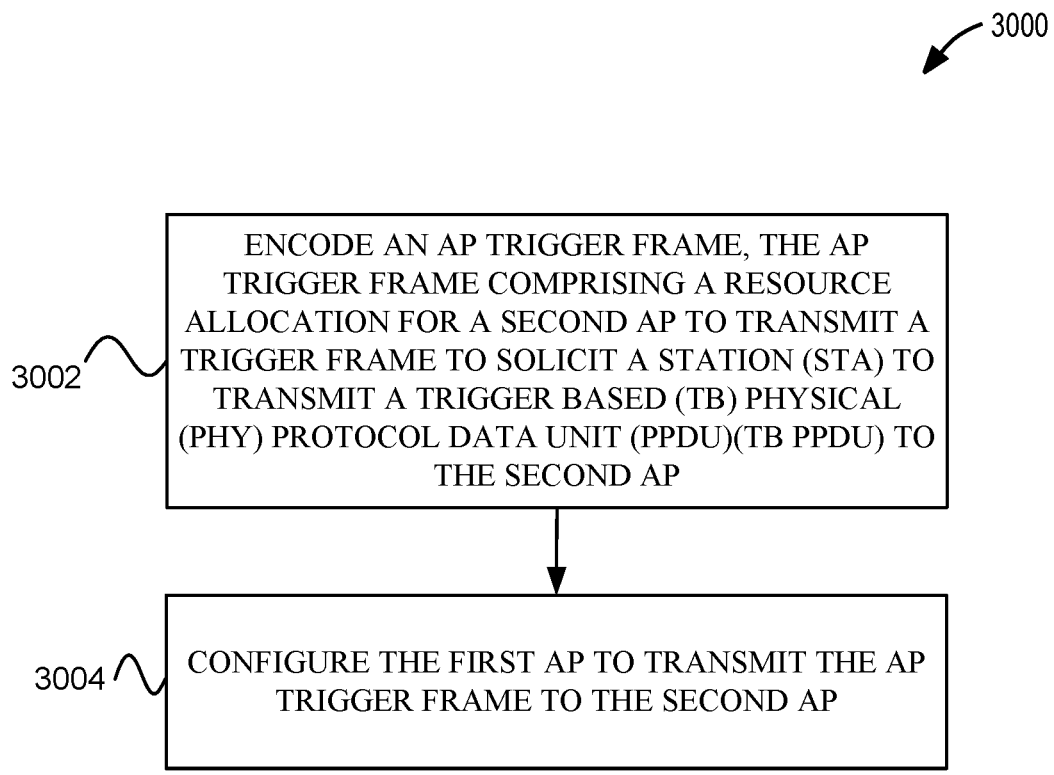
FIG. 30 illustrates a method of coordinating multiple APs, in accordance with some embodiments.

FIG. 30 illustrates a method 3000 of coordinating multiple APs, in accordance with some embodiments. The method 3000 begins at operation 3002 with encoding an AP trigger frame, the AP trigger frame comprising a resource allocation for a second AP to transmit a trigger frame to solicit a STA to transmit a TB PPDU to the second AP. For example, the AP trigger frame may be the same or similar as trigger frame 2900. FIGS. 23-28 illustrate embodiments of an AP trigger frame. The AP trigger frame may include one or more of the parameters disclosed in conjunction with FIGS. 8-33.

The method 3000 continues at operation 3004 with configuring the first AP to transmit the AP trigger frame to the second AP. For example, the AP may be wireless device 700 and an apparatus that comprises a portion of the wireless device 700 may configure the wireless device 700 to transmit the AP trigger frame.

Method 3000 may include one or more additional operations. One or more of the operations of method 3000 may be optional. The operations of method 3000 may be performed in a different order.

Figure 31:
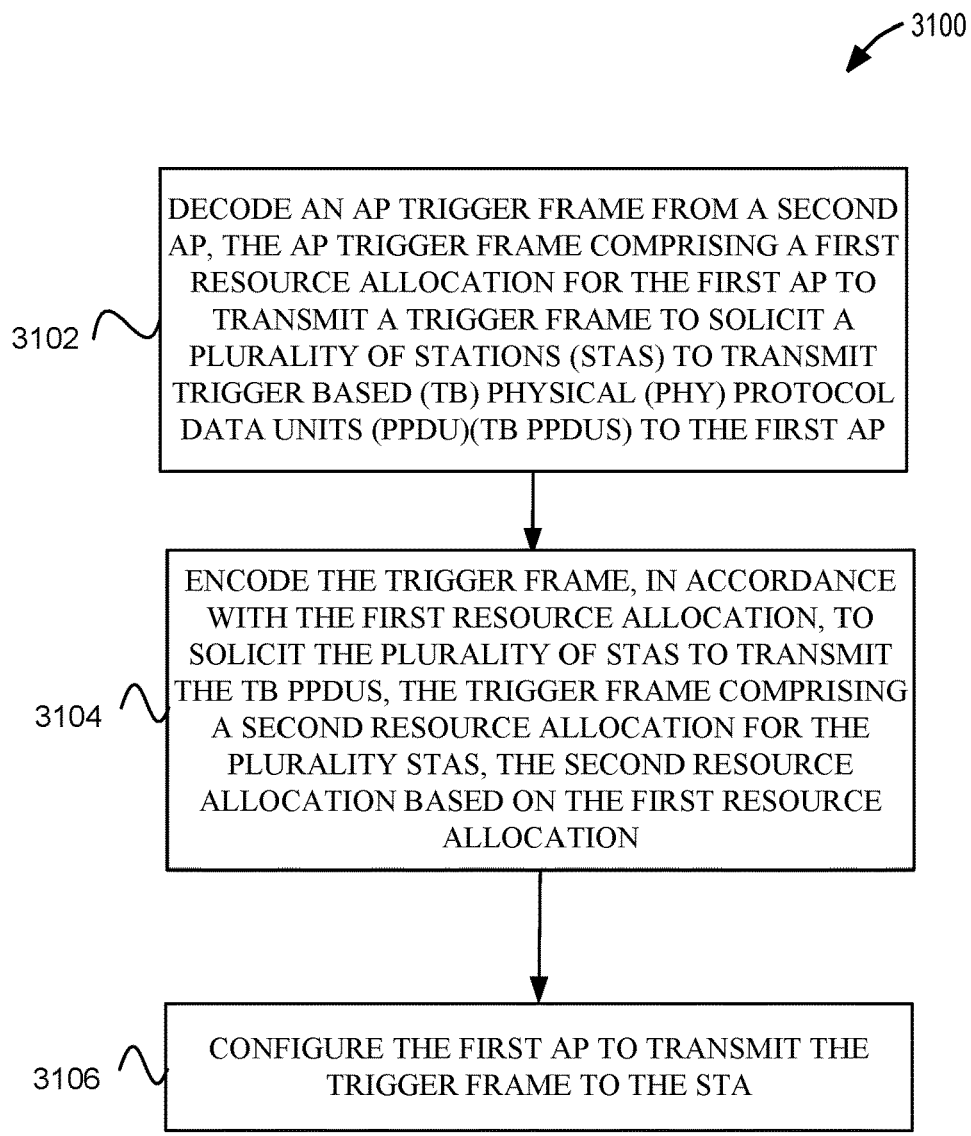
FIG. 31 illustrates a method of coordinating multiple APs, in accordance with some embodiments.

FIG. 31 illustrates a method 3100 of coordinating multiple APs, in accordance with some embodiments. The method 3100 begins at operation 3102 with decoding an AP trigger frame from a second AP, the AP trigger frame comprising a first resource allocation for the first AP to transmit a trigger frame to solicit a plurality of STAs to transmit TB PPDUs to the first AP. For example, the trigger frame may be the same or similar as trigger frame 2900. FIGS. 23-28 illustrate embodiments of an AP trigger frame. FIG. 27 illustrates APs receiving and decoding the AP trigger frame.

The method 3100 continues at operation 3104 with encoding the trigger frame, in accordance with the first resource allocation, to solicit the plurality of STAs to transmit the TB PPDUs, the trigger frame comprising a second resource allocation for the plurality STAs, the second resource allocation based on the first resource allocation. For example, the trigger frame may be the same or similar as trigger frame 2900. The first AP determines the resource allocation for the trigger frame based on the resource allocation of the AP trigger frame. For example, the channels or RUs for the STAs to use may be based on the allocation in the AP trigger frame. As another example, the type and duration of a signal field in the preamble may be determined based on the resource allocation in the AP trigger frame. The AP trigger frame may include one or more of the parameters disclosed in conjunction with FIGS. 8-33.

The method 3100 continues at operation 3004 with configuring the first AP to transmit the trigger frame to the STA. For example, the first AP may be wireless device 700 and an apparatus that comprises a portion of the wireless device 700 may configure the wireless device 700 to transmit the AP trigger frame.

Method 3100 may include one or more additional operations. One or more of the operations of method 3100 may be optional. The operations of method 3000 may be performed in a different order.

Figure 32:
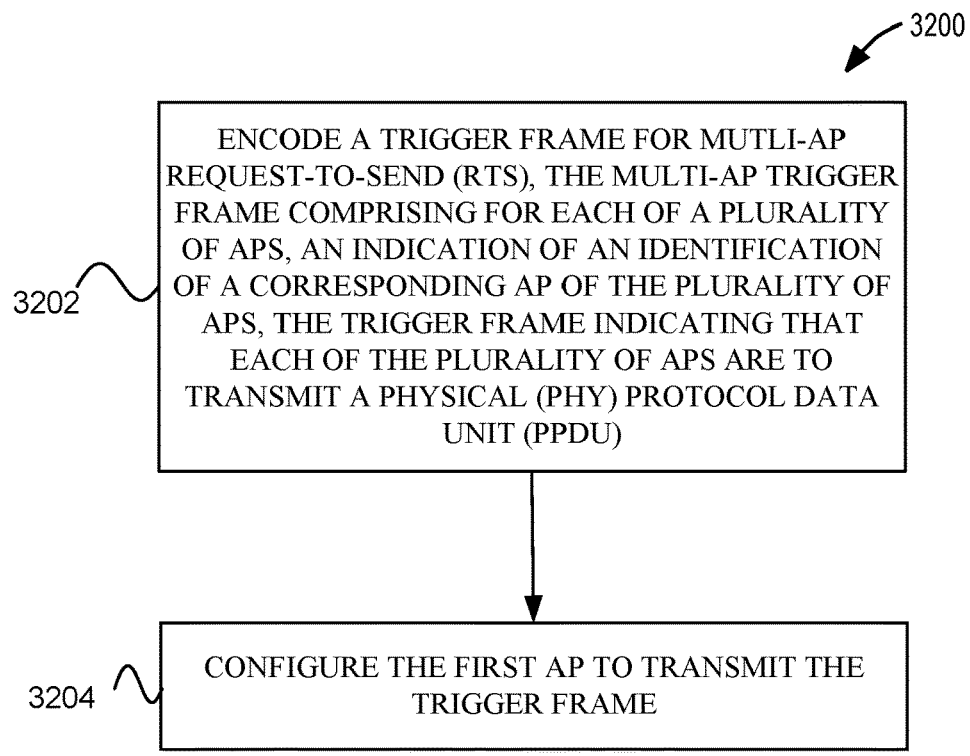
FIG. 32 illustrates a method 3200 of coordinating multiple APs, in accordance with some embodiments. And, FIG. 33 illustrates a method of coordinating multiple APs, in accordance with some embodiments.

FIG. 32 illustrates a method 3200 of coordinating multiple APs, in accordance with some embodiments. The method 3200 begins at operation 3202 with encode a trigger frame for multi-AP RTS, the multi-AP trigger frame comprising for each of a plurality of APs, an indication of an identification of a corresponding AP of the plurality of APs, the trigger frame indicating that each of the plurality of APs are to transmit a PPDU. For example, an AP may transmit the multi-AP trigger frame of FIGS. 13-19. The trigger frame may include one or more of the parameters disclosed in conjunction with FIGS. 8-33.

The method 3200 continues at operation 3004 with configuring the first AP to transmit the trigger frame. For example, the AP may be a wireless device 700 and an apparatus that comprises a portion of the wireless device 700 may configure the wireless device 700 to transmit the AP trigger frame.

Method 3200 may include one or more additional operations. One or more of the operations of method 3200 may be optional. The operations of method 3000 may be performed in a different order.

Figure 33:
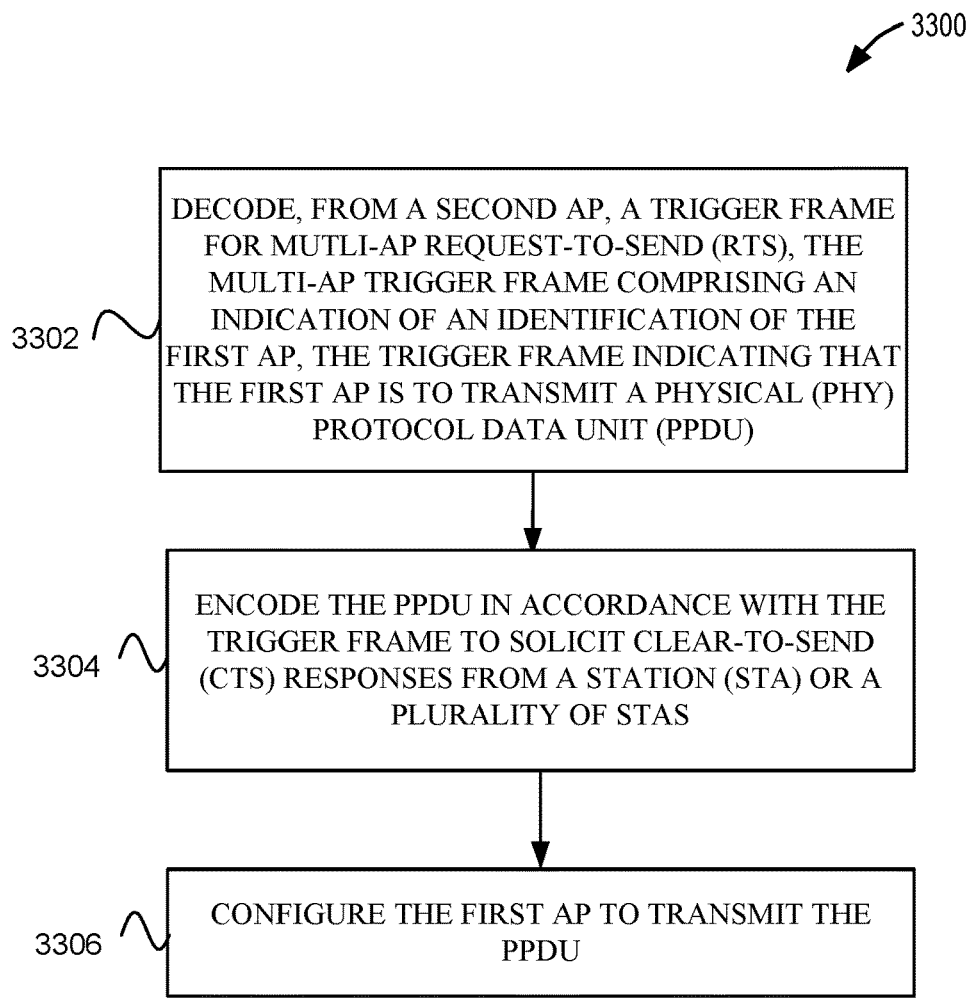

FIG. 33 illustrates a method 3300 of coordinating multiple APs, in accordance with some embodiments. The method 3300 begins at operation 3302 with decoding, from a second AP, a trigger frame for multi-AP RTS, the multi-AP trigger frame comprising an indication of an identification of the first AP, the trigger frame indicating that the first AP is to transmit a PPDU. For example, an AP of FIGS. 13-19 decodes a multi-AP trigger frame. The trigger frame may include one or more of the parameters disclosed in conjunction with FIGS. 8-33.

The method 3300 continues at operation 3304 with encoding the PPDU in accordance with the trigger frame to solicit CTS responses from a STA or a plurality of STAs. For example, an AP of FIGS. 15-18 transmits a MU-RTS or RTS.

The method 3300 continues at operation 3006 with configuring the first AP to transmit the PPDU. For example, the AP may be a wireless device 700 and an apparatus that comprises a portion of the wireless device 700 may configure the wireless device 700 to transmit the PPDU.

Method 3300 may include one or more additional operations. One or more of the operations of method 3300 may be optional. The operations of method 3000 may be performed in a different order.

One or more of the parameters disclosed herein may be indicated in a field or fields in a trigger frame or anther frame that is transmitted from the master AP to one or more the slave APs. One or more of the parameters disclosed herein may be indicated during a set-up phase such as in a capabilities element. One or more of the parameters disclosed herein may be indicated during an agreement phase for such as in an element for transmissions with multi-APs.

Example 1 is an apparatus of an access point (AP), the apparatus comprising memory; and processing circuitry coupled to the memory, the processing circuitry configured to: encode a trigger frame for multi-AP request-to-send (RTS), the multi-AP trigger frame comprising for each of a plurality of APs, an indication of an identification of a corresponding AP of the plurality of APs, the trigger frame indicating that each of the plurality of APs are to transmit a physical (PHY) protocol data unit (PPDU); and configure the AP to transmit the trigger frame.

In Example 2, the subject matter of Example 1 includes, wherein the PPDU is an RTS or a MU-RTS. In Example 3, the subject matter of Examples 1-2 includes, wherein the multiply-AP trigger frame indicates that each of the plurality of APs are to transmit a multi-user (MU) RTS (MU-RTS). In Example 4, the subject matter of Example 3 includes, wherein the multi-AP MU-RTS indicates a station (STA) for each of the plurality of APs to transmit an RTS to. In Example 5, the subject matter of Examples 1-4 includes, wherein the trigger frame further comprises an indication of a bandwidth and frequency for each of the plurality of APs to transmit the RTS.

In Example 6, the subject matter of Examples 1-5 includes, communication format, an indication of a type of PPDU, an indication that the type of PPDU is to be single user, an indication that the type of PPDU is to be multi-user, an indication of a modulation and coding scheme (MCS) to be used to encode the PPDU, an indication of a guard interval to be used to transmit the PPDU, an indication of a preamble format to use, an indication that of a type of long-training field (LTF) to use, an indication of a long-training field duration to use, an indication of a SIGNAL field duration to use, and an indication of a padding duration to use.

In Example 7, the subject matter of Examples 1-6 includes, wherein the trigger frame comprises an indication of information to populate fields of a high-efficiency (HE) signal field A. In Example 8, the subject matter of Examples 1-7 includes, and no dual carrier modulation, and a format where a scramble initialization value is to be set to copy from the trigger frame. In Example 9, the subject matter of Examples 1-8 includes, wherein the trigger frame indicates a duration for the PPDU.

In Example 10, the subject matter of Examples 1-9 includes, wherein the PPDU is a multi-user (MU) RTS (MU-RTS) and each of the plurality of APs are to encode the PPDU with a transmitter address (TA) with a same value as a TA of the trigger frame and with a receiver address (RA) with a value indicating a broadcast address.

In Example 11, the subject matter of Examples 1-10 includes, wherein the plurality of APs are to determine a network allocation vector (NAV) duration based on a value of a duration field in the trigger frame. In Example 12, the subject matter of Examples 1-11 includes, wherein the processing circuitry comprises one or more application specific integrated circuits (ASICs).

Example 13 is a non-transitory computer-readable storage medium that stores instructions for execution by one or more processors of an access point (AP), the instructions to configure the one or more processors to: encode a trigger frame for multi-AP request-to-send (RTS), the multi-AP trigger frame comprising for each of a plurality of APs, an indication of an identification of a corresponding AP of the plurality of APs, the trigger frame indicating that each of the plurality of APs are to transmit a physical (PHY) protocol data unit (PPDU); and configure the AP to transmit the multiple-AP trigger frame.

Example 14 is an apparatus of a first access point (AP), the apparatus comprising memory; and processing circuitry coupled to the memory, the processing circuitry configured to: decode, from a second AP, a trigger frame for multi-AP request-to-send (RTS), the multi-AP trigger frame comprising an indication of an identification of the first AP, the trigger frame indicating that the first AP is to transmit a physical (PHY) protocol data unit (PPDU); encode the PPDU in accordance with the trigger frame to solicit clear-to-send (CTS) responses from a station (STA) or a plurality of STAs; and configure the first AP to transmit the PPDU.

In Example 15, the subject matter of Example 14 includes, MHz channels the PPDU is to be transmitted. In Example 16, the subject matter of Examples 14-15 includes, MHz channel on which the trigger frame was decoded.

In Example 17, the subject matter of Examples 14-16 includes, wherein the PPDU comprises a RTS frame, and wherein the method further comprises: in response to the trigger frame indicating another AP, perform one or more of the following: encode the PPDU in accordance with one or more of the following group: set a scrambler initialization value from the trigger frame; set a power bit of the RTS frame to 0; set a more data bit of the RTS frame to 0; set of the bandwidth of the PPDU based on an indication of the bandwidth from the trigger frame; encode the RTS to indicate an uplink (UL) bandwidth from the STA or the plurality of STAs based on an indication in the trigger frame; order per user fields for the STA or plurality of STAs in accordance with an indication in the trigger frame; indicate an resource unit (RU) for the STA or the plurality of STAs based on an indication of the RU for the STA or the plurality of STAs in the trigger frame; and, pad a number of the per user fields in accordance with an indication in the trigger frame.

In Example 18, the subject matter of Example 17 includes, Mb/s transmission rate; an receiver address (RA) with a value of the transmitter address (TA) from the PPDU; and, a bandwidth in accordance with an indication of the bandwidth in the MU-RTS frame.

In Example 19, the subject matter of Examples 17-18 includes, wherein the MU-RTS frame comprises a field indicating that the MU-RTS is part of a multi-AP transmission sequence. In Example 20, the subject matter of Examples 14-19 includes, wherein the processing circuitry comprises one or more application specific integrated circuits (ASICs).

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20. Example 23 is a system to implement of any of Examples 1-20. Example 24 is a method to implement of any of Examples 1-20.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a first access point (AP), the apparatus comprising memory; and processing circuitry coupled to the memory, the processing circuitry configured to:
    encode an AP trigger frame, the AP trigger frame comprising a resource allocation for a second AP to transmit a data frame to a station (STA) or a trigger frame to solicit a station (STA) to transmit a trigger based (TB) physical (PHY) protocol data unit (PPDU)(TB PPDU) to the second AP, wherein the resource allocation indicates information for the second AP to coordinate frequency and time offsets with the first AP, the resource allocation indicating one or more of the following group: a frequency offset, a time offset, an indication of a subcarrier position, and an indication of a timing format; and
    configure the first AP to transmit the AP trigger frame to the second AP.

2. The apparatus of claim 1 wherein the AP trigger frame comprises a plurality of resource allocations for a plurality of APs to simultaneously transmit a plurality of trigger frames to solicit a plurality of STAs to simultaneously transmit TB PPDUs or for the plurality of APs to simultaneously transmit data frames to the plurality of STAs, wherein the second AP is one of the plurality of APs, the STA is one of the plurality of STAs, and the trigger frame is one of the plurality of trigger frames, and wherein the plurality of resource allocations indicate that the plurality of APs and the plurality of STAs are to transmit with symbol boundaries aligned.

3. The apparatus of claim 2 wherein the AP trigger frame comprises a duration for a transmission opportunity (TXOP), the TXOP comprising the transmission of a trigger frame from the second AP to the STA and wherein resource allocation indicates that two of the plurality of APs are to transmit on a same channel or on different channels.

4. The apparatus of claim 2 wherein the AP trigger frame comprises a duration for a transmission opportunity (TXOP), wherein the TXOP comprises a duration to include the simultaneous transmissions of the plurality of STAs.

5. The apparatus of claim 2 wherein the resource allocation indicates information for the plurality of APs to coordinate the transmission of preambles of the plurality of data frames or trigger frames, or the TB PPDUs, the resource allocation comprising one or more of the following group: a preamble type, a preamble duration, an indication of a long-training field duration, and an indication of a short-training field duration.

6. The apparatus of claim 2 wherein the resource allocation indicates information for the plurality of APs to coordinate transmissions of data portions of the plurality of trigger frames and the TB PPDUs, the resource allocation comprising one or more of the following group: an indication of an orthogonal frequency division multiplexing (OFDM) symbol duration, an indication of an orthogonal frequency division multiple-access (OFDMA) symbol duration, an indication of a cyclic prefix (CP), an indication of a resource unit (RU) usage, an indication of a RU power, an indication of a modulation and coding scheme (MCS), an indication of a number of spatial streams, an indication of the allocated spatial streams, and an indication of a packet extension format.

7. The apparatus of claim 2 wherein the AP trigger frame comprises common information for the plurality of APs and a plurality of AP specific fields, the plurality of AP specific fields each comprising an identification of a corresponding AP of the plurality of APs and a resource allocation for the corresponding AP to transmit a data frame or to transmit a trigger frame and to allocate to STAs to transmit the plurality of TB PPDUs.

8. The apparatus of claim 1 wherein the processing circuitry is further configured to:
decode a packet from the second AP, the packet comprising measurement information based on signals received by the second AP; and
determine the resource allocation based on the measurement information.

9. The apparatus of claim 1 wherein the processing circuitry is further configured to:
encode, in accordance with the resource allocation, a trigger frame to configure a plurality of STAs to simultaneously transmit trigger based (TB) physical (PHY) protocol data units (PPDUs)(TB PPDUs) to the first AP.

10. The apparatus of claim 1 wherein the AP trigger frame comprises a plurality of resource allocations for a plurality of APs to simultaneously transmit a plurality of trigger frames.

11. The apparatus of claim 10 wherein the plurality of resource allocations indicate that symbol boundaries for the preamble and data portion of the plurality of trigger frames are to be aligned with padding.

12. The apparatus of claim 10, wherein the plurality of resource allocations indicate resource units (RUs) for the plurality of APs, the RUs each indicating a bandwidth or a number of spatial streams for a corresponding AP of the plurality of APs to transmit a trigger frame of the plurality of trigger frames.

13. The apparatus of claim 10, wherein the plurality of APs is a first plurality of APs, and wherein the processing circuitry is further configured to:
encode a polling trigger for a second plurality of APs, the second plurality of APs comprising the first plurality of APs;
configure the first AP to transmit the polling trigger to the second plurality of APs;
decode responses from the second plurality of APs; and
determine the first plurality of APs based on the responses from the second plurality of APs.

14. The apparatus of claim 10, wherein the plurality of resource allocations indicate a primary channel and a secondary channel for each of the plurality of APs.

15. The apparatus of claim 1, wherein the processing circuitry comprises one or more application specific integrated circuits (ASICs).

16. A non-transitory computer-readable storage medium that stores instructions for execution by one or more processors of a first access point (AP), the instructions to configure the one or more processors to:
encode an AP trigger frame, the AP trigger frame comprising a resource allocation for a second AP to transmit a data frame to a station (STA) or a trigger frame to solicit a station (STA) to transmit a trigger based (TB) physical (PHY) protocol data unit (PPDU)(TB PPDU) to the second AP, wherein the resource allocation indicates information for the second AP to coordinate frequency and time offsets with the first AP, the resource allocation indicating one or more of the following group: a frequency offset, a time offset, an indication of a subcarrier position, and an indication of a timing format; and
configure the first AP to transmit the AP trigger frame to the second AP.

17. The non-transitory computer-readable storage medium of claim 16, wherein the AP trigger frame comprises a plurality of resource allocations for a plurality of APs to simultaneously transmit a plurality of trigger frames to solicit a plurality of STAs to simultaneously transmit TB PPDUs or for the plurality of APs to simultaneously transmit data frames to a plurality of STAs, wherein the second AP is one of the plurality of APs, the STA is one of the plurality of STAs, and the trigger frame is one of the trigger frames, and wherein the plurality of resource allocations indicate that the plurality of APs and the plurality of STAs are to transmit with symbol boundaries aligned.

18. An apparatus of a first access point (AP), the apparatus comprising memory; and processing circuitry coupled to the memory, the processing circuitry configured to:
decode an AP trigger frame from a second AP, the AP trigger frame comprising a first resource allocation for the first AP to transmit a trigger frame to solicit a plurality of stations (STAs) to transmit trigger based (TB) physical (PHY) protocol data units (PPDU)(TB PPDUs) to the first AP, wherein the resource allocation indicates information for the first AP to coordinate frequency and time offsets with the second AP, the resource allocation indicating one or more of the following group: a frequency offset, a time offset, an indication of a subcarrier position, and an indication of a timing format; and;
encode the trigger frame, in accordance with the first resource allocation, to solicit the plurality of STAs to transmit the TB PPDUs, the trigger frame comprising a second resource allocation for the plurality STAs, the second resource allocation based on the first resource allocation; and
configure the first AP to transmit the trigger frame to the STA.

19. The apparatus of claim 18 wherein the second resource allocation comprises one or more of the following group: a preamble type, a preamble duration, an indication of an orthogonal frequency division multiplexing (OFDM) symbol duration, an indication of an orthogonal frequency division multiple-access (OFDMA) symbol duration, an indication of a cyclic prefix (CP), an indication of a long-training field duration, an indication of a short-training field duration, an indication of a resource unit (RU) usage, an indication of a RU power, an indication of a modulation and coding scheme (MCS), an indication of a number of spatial streams, an indication of a packet extension format, a frequency offset, a time offset, an indication of a subcarrier position, and an indication of a timing format.

\* \* \* \* \*